(12) United States Patent
Alhooshani et al.

(10) Patent No.: US 12,515,193 B2
(45) Date of Patent: *Jan. 6, 2026

(54) METHOD FOR ISOLATING A HEAVY METAL ION FROM AN AQUEOUS SOLUTION

(71) Applicant: KING FAHD UNIVERSITY OF PETROLEUM AND MINERALS, Dhahran (SA)

(72) Inventors: Khalid Alhooshani, Dhahran (SA); Kazeem O. Sulaiman, Dhahran (SA); Muhammad Sajid, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/216,169

(22) Filed: May 22, 2025

(65) Prior Publication Data

US 2025/0281897 A1    Sep. 11, 2025

Related U.S. Application Data

(63) Continuation of application No. 17/505,117, filed on Oct. 19, 2021, now Pat. No. 12,343,700.
(Continued)

(51) Int. Cl.
*B01J 20/18* (2006.01)
*B01J 20/28* (2006.01)
(Continued)

(52) U.S. Cl.
CPC ....... *B01J 20/186* (2013.01); *B01J 20/28004* (2013.01); *B01J 20/28016* (2013.01);
(Continued)

(58) Field of Classification Search
CPC .......... C02F 1/288; C02F 1/281; C02F 1/285; C02F 1/28; C02F 2101/22; C02F 2303/16;
(Continued)

(56) References Cited

U.S. PATENT DOCUMENTS 8,540,810 B2    9/2013  Perera et al.
8,669,200 B2    3/2014  Perera et al.
(Continued)

FOREIGN PATENT DOCUMENTS

CN     202881005 U    4/2013
CN     108339532 A    7/2018

OTHER PUBLICATIONS

Machawe Mxolisi Motsa, et al., "Polypropylene-zeolite polymer composites for water purification: synthesis, characterisation and application", Desalination and Water Treatment, vol. 53, No. 10, 2015, pp. 2604-2612.
(Continued)

*Primary Examiner* — Akash K Varma
(74) *Attorney, Agent, or Firm* — Oblon, McClelland, Maier & Neustadt, L.L.P.

(57) ABSTRACT

A sorbent device based on a porous membrane bag (e.g., porous propylene membrane bag) encapsulated alkaline-modified zeolite (e.g., alkaline-treated USY zeolite). A process for removing heavy metals, such as Cd(II), Cr(III), and Pb(II) from an aqueous solution or an industrial wastewater samples with the sorbent device is provided. A method for preparing the alkaline-modified zeolite is also described.

14 Claims, 16 Drawing Sheets

Related U.S. Application Data

(60) Provisional application No. 63/093,826, filed on Oct. 20, 2020.

(51) Int. Cl.
*B01J 20/30* (2006.01)
*C02F 1/28* (2023.01)
*C02F 101/22* (2006.01)

(52) U.S. Cl.
CPC ..... *B01J 20/2805* (2013.01); *B01J 20/28059* (2013.01); *B01J 20/28061* (2013.01); *B01J 20/28064* (2013.01); *B01J 20/28071* (2013.01); *B01J 20/28073* (2013.01); *B01J 20/28076* (2013.01); *B01J 20/3085* (2013.01); *C02F 1/288* (2013.01); *B01J 2220/66* (2013.01); *C02F 1/281* (2013.01); *C02F 1/285* (2013.01); *C02F 2101/22* (2013.01); *C02F 2303/16* (2013.01)

(58) Field of Classification Search
CPC ................ B01J 20/186; B01J 20/28004; B01J 20/28016; B01J 20/2805; B01J 20/28059; B01J 20/28061; B01J 20/28064; B01J 20/28071; B01J 20/28073; B01J 20/28076; B01J 20/3085; B01J 20/18; B01J 20/28; B01J 20/30
USPC ........................................................ 210/670
See application file for complete search history.

(56) References Cited

U.S. PATENT DOCUMENTS

| 8,758,607 | B2 | 6/2014 | Athanasiadis | |
| 2009/0305871 | A1* | 12/2009 | Perera | D01D 5/24 425/464 |
| 2010/0035751 | A1* | 2/2010 | Perera | B01J 20/28023 502/402 |
| 2011/0309024 | A1* | 12/2011 | Athanasiadis | C02F 1/004 210/283 |
| 2019/0009214 | A1* | 1/2019 | Liu | B01D 67/00113 |

OTHER PUBLICATIONS

Yonghua Wang, et al., "Zeolitic imidazolate framework-8 as sorbent of micro-solid-phase extraction to determine estrogens in environmental water samples", Journal of Chromatography A, vol. 1291, May 24, 2013, pp. 27-32 (Abstract only).

Atikah Mohd Nasir, et al., "Adsorptive nanocomposite membranes for heavy metal remediation: Recent progresses and challenges", CHEMOSPHERE, vol. 232, Oct. 2019, pp. 96-112 (Abstract only).

* cited by examiner

METHOD FOR ISOLATING A HEAVY METAL ION FROM AN AQUEOUS SOLUTION

CROSS REFERENCE TO RELATED APPLICATIONS

The present application is a Continuation of U.S. application Ser. No. 17/505,117, now allowed, having a filing date of Oct. 19, 2021 which claims benefit of priority of U.S. Provisional Application No. 63/093,826, having a filing date of Oct. 20, 2020 and which is incorporated herein by reference in its entirety.

STATEMENT OF FUNDING ACKNOWLEDGEMENT

This project was funded by King Fahd University of Petroleum and Minerals (KFUPM) through project number DSR NUS15105.

STATEMENT REGARDING PRIOR DISCLOSURE BY THE INVENTORS

Aspects of this technology are described in an article "Application of porous membrane bag enclosed alkaline treated Y-Zeolite for removal of heavy metal ions from water" published in Microchemical Journal, 152 (2020), 104289, on Oct. 21, 2019, which is incorporated herein by reference in its entirety.

BACKGROUND OF THE INVENTION

Technical Field

The present disclosure relates to a sorbent device. More specifically, the present disclosure relates to a sorbent device based on alkaline-treated zeolite encapsulated by a porous membrane bag, and a method for using the sorbent device to adsorb and remove heavy metals from contaminated aqueous solutions.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Heavy metal pollution is a threat to the global environment. Heavy metals can be introduced into the environment via natural and anthropogenic activities. Heavy metal contamination of water resources poses serious risks to the health of humans and wildlife. Different strategies have been proposed to decontaminate water by removing heavy metals present therein. Adsorptive removal is one of the most widely used approaches [M. Sajid, M. K. Nazal, Ihsanullah, N. Baig, A. M. Osman, Removal of heavy metals and organic pollutants from water using dendritic polymers based adsorbents: A critical review, Sep. Purif. Technol. 191 (2018) 400-423, incorporated herein by reference in its entirety]. Substantial research and development activities have been devoted to synthesize selective and effective adsorbents. Despite recent achievements, there is still a need for adsorption technologies and devices that are simple, low-cost, portable, and efficient. It is highly desirable to develop adsorption technologies that can be directly employed in water scarce areas for in situ water purification without utilizing sophisticated equipment.

Porous membrane protected micro solid-phase extraction (μ-SPE), which involves packing a sorbent inside a porous membrane bag via heat-sealing, was introduced in 2006 as an alternative to traditional SPE [C. Basheer, A. A. Alnedhary, B. S. M. Rao, S. Valliyaveettil, H. K. Lee, Development and application of porous membrane-protected carbon nanotube micro-solid-phase extraction combined with gas chromatography/mass spectrometry, Anal. Chem. 78 (2006) 2853-8; and M. Sajid, Porous membrane protected micro-solid-phase extraction: A review of features, advancements and applications, Anal. Chim. Acta. 965 (2017) 36-53, each incorporated herein by reference in their entirety]. The resulting μ-SPE device is used for analytical extraction of target analytes with a sorbent packed inside a porous membrane bag. These analytes are then desorbed from the enclosed sorbent with a suitable desorption solvent then subjected to instrumental analysis. Compared to traditional SPE, μ-SPE utilizes small amounts of sorbent (e.g., milligram level) and elution solvent (microliter level).

This feature lowers the overall cost of the process and minimizes the impact on workers and the environment. Accordingly, μ-SPE has been widely used for extracting a variety of target pollutants in different media [M. Sajid, Porous membrane protected micro-solid-phase extraction: A review of features, advancements and applications, Anal. Chim. Acta. 965 (2017) 36-53; W. S. Khayoon, B. Saad, B. Salleh, N. H. A. Manaf, A. A. Latiff, Micro-solid phase extraction with liquid chromatography-tandem mass spectrometry for the determination of aflatoxins in coffee and malt beverage, Food Chem. 147 (2014) 287-94; X.-Y. Yin, Y.-M. Luo, J.-J. Fu, Y.-Q. Zhong, Q.-S. Liu, Determination of hyperoside and isoquercitrin in rat plasma by membrane-protected micro-solid-phase extraction with high-performance liquid chromatography, J. Sep. Sci. 35 (2012) 384-91; J. Sánchez-González, S. García-Carballal, P. Cabarcos, M. J. Tabernero, P. Bermejo-Barrera, A. Moreda-Piñeiro, Determination of cocaine and its metabolites in plasma by porous membrane-protected molecularly imprinted polymer micro-solid-phase extraction and liquid chromatography-tandem mass spectrometry, J. Chromatogr. A. 1451 (2016) 15-22; N. Naing, S. F. Y. Li, H. K. Lee, Application of porous membrane-protected chitosan microspheres to determine benzene, toluene, ethylbenzene, xylenes and styrene in water, J. Chromatogr. A. 1448 (2016) 42-48; J. Sánchez-González, M. J. Tabernero, A. M. Bermejo, P. Bermejo-Barrera, A. Moreda-Piñeiro, Porous membrane-protected molecularly imprinted polymer micro-solid-phase extraction for analysis of urinary cocaine and its metabolites using liquid chromatography-Tandem mass spectrometry, Anal. Chim. Acta. 898 (2015) 50-9; T. Wang, J. Wang, C. Zhang, Z. Yang, X. Dai, M. Cheng, X. Hou, Metal-organic framework MIL-101(Cr) as a sorbent of porous membrane-protected micro-solid-phase extraction for the analysis of six phthalate esters from drinking water: a combination of experimental and computational study, Analyst. 140 (2015) 5308-16; M. Sajid, C. Basheer, M. Mansha, Membrane protected micro-solid-phase extraction of organochlorine pesticides in milk samples using zinc oxide incorporated carbon foam as sorbent, J. Chromatogr. A. 1475 (2016); M. Sajid, C. Basheer, Stir-bar supported micro-solid-phase extraction for the determination of polychlorinated biphenyl congeners in serum samples, J. Chromatogr. A. 1455 (2016) 37-44; M. Sajid, C. Basheer, A. Alsharaa, K. Narasimhan, A.

Buhmeida, M. Al Qahtani, M. S. Al-Ahwal, Development of natural sorbent based micro-solid-phase extraction for determination of phthalate esters in milk samples, Anal. Chim. Acta. 924 (2016); and M. Sajid, C. Basheer, M. Daud, A. Alsharaa, Evaluation of layered double hydroxide/graphene hybrid as a sorbent in membrane-protected stir-bar supported micro-solid-phase extraction for determination of organochlorine pesticides in urine samples, J. Chromatogr. A. 1489 (2017) 1-8, each incorporated herein by reference in their entirety]. However, applications of the μ-SPE technology have focused on extraction of analytes for analytical determination. μ-SPE technology has not been used for adsorptive removal of heavy metals in a process or system for water decontamination. The present disclosure shows that μ-SPE has great potential for removal applications mainly because of its miniaturized dimensions, portability, and suitability for in situ applications in water scarce areas. It is suitable for in situ and on site applications because of it provides rapid phase separation without additional centrifugation and filtration. Additionally, the sorbent can be conveniently separated from the sample solution by removing the membrane bag in which it is packed. This helps minimize additional equipment and/or steps needed in conventional adsorption procedures.

In addition to considerations of the aforementioned adsorption device and operation setup, the choice of appropriate adsorbent is crucial for an effective heavy metal removal. Sorbents used for metal ion removal processes include ion exchange resins [A. Dabrowski, Z. Hubicki, P. Podkościelny, E. Robens, Selective removal of the heavy metal ions from waters and industrial wastewaters by ion-exchange method, Chemosphere. 56 (2004) 91-106, incorporated herein by reference in its entirety], carbon nanomaterials [G. Yu, Y. Lu, J. Guo, M. Patel, A. Bafana, X. Wang, B. Qiu, C. Jeffryes, S. Wei, Z. Guo, E. K. Wujcik, Carbon nanotubes, graphene, and their derivatives for heavy metal removal, Adv. Compos. Hybrid Mater. 1 (2018) 56-78; and J. Y. Lim, N. M. Mubarak, E. C. Abdullah, S. Nizamuddin, M. Khalid, Inamuddin, Recent trends in the synthesis of graphene and graphene oxide based nanomaterials for removal of heavy metals—A review, J. Ind. Eng. Chem. (2018), each incorporated herein by reference in their entirety], silica based sorbents [W. Ngeontae, W. Aeungmaitrepirom, T. Tuntulani, Chemically modified silica gel with aminothioamidoanthraquinone for solid phase extraction and preconcentration of Pb(II), Cu(II), Ni(II), Co(II) and Cd(II), Talanta. 71 (2007) 1075-1082, incorporated herein by reference in its entirety], natural sorbents [S. Babel, T. A. Kurniawan, Low-cost adsorbents for heavy metals uptake from contaminated water: a review, J. Hazard. Mater. 97 (2003) 219-243, incorporated herein by reference in their entirety], activated carbon [E. A. Deliyanni, G. Z. Kyzas, K. S. Triantafyllidis, K. A. Matis, Activated carbons for the removal of heavy metal ions: A systematic review of recent literature focused on lead and arsenic ions, Open Chem. 13 (2015), incorporated herein by reference in their entirety], metal organic frameworks [J. E. Efome, D. Rana, T. Matsuura, C. Q. Lan, Metal-organic frameworks supported on nanofibers to remove heavy metals, J. Mater. Chem. A. 6 (2018) 4550-4555; J. E. Efome, D. Rana, T. Matsuura, C. Q. Lan, Insight Studies on Metal-Organic Framework Nanofibrous Membrane Adsorption and Activation for Heavy Metal Ions Removal from Aqueous Solution, ACS Appl. Mater. Interfaces. 10 (2018) 18619-18629; J. E. Efome, D. Rana, T. Matsuura, C. Q. Lan, Experiment and modeling for flux and permeate concentration of heavy metal ion in adsorptive membrane filtration using a metal-organic framework incorporated nanofibrous membrane, Chem. Eng. J. 352 (2018) 737-744; and J. E. Efome, D. Rana, T. Matsuura, C. Q. Lan, Effects of operating parameters and coexisting ions on the efficiency of heavy metal ions removal by nano-fibrous metal-organic framework membrane filtration process, Sci. Total Environ. 674 (2019) 355-362, each incorporated herein by reference in their entirety], Linde Type A (LTA), and Y-type zeolites [Y. P. de Peña, W. Rondón, Linde Type a Zeolite and Type Y Faujasite as a Solid-Phase for Lead, Cadmium, Nickel and Cobalt Preconcentration and Determination Using a Flow Injection System Coupled to Flame Atomic Absorption Spectrometry, Am. J. Anal. Chem. 04 (2013) 387-397, incorporated herein by reference in its entirety].

Despite these advances, activated carbon (AC) is preferred due to its porous structure, large surface area, selective adsorption, high adsorption capacity, high purity, and environmental friendliness [V. A. Lemos, L. S. G. Teixeira, M. de A. Bezerra, A. C. S. Costa, J. T. Castro, L. A. M. Cardoso, D. S. de Jesus, E. S. Santos, P. X. Baliza, L. N. Santos, New Materials for Solid-Phase Extraction of Trace Elements, Appl. Spectrosc. Rev. 43 (2008) 303-334, incorporated herein by reference in its entirety]. However, the high cost of regeneration of spent AC renders it economically inferior compared to zeolite for removing heavy metals from contaminated waters.

Spent zeolites have been used for extraction and concentration of toxic metals [Y. V. Pokonova, Adsorbents from spent zeolites, Solid Fuel Chem. 46 (2012) 179-184, incorporated herein by reference in its entirety]. For example, modified natural zeolites [R. Jamshidi, Z. Afzali, K. Afzali, Modified Natural Zeolites as Sorbents for Separation and Preconcentration of Traces Amount of Metal Ions, Asian J. Chem. 21 (2009) 3381-3384, incorporated herein by reference in its entirety] and spent zeolite obtainable from petroleum refining processes showed comparatively better sorption capacity than KAD-iodine activated carbon in waste water purification. The improved surface area, pore structure, and polarity imparted by hydroxyl groups on the zeolite surface contribute to its function as an effective adsorbent [Y. V. Pokonova, Adsorbents from spent zeolites, Solid Fuel Chem. 46 (2012) 179-184, incorporated herein by reference in its entirety]. Although hierarchical ultrastable Y (USY) zeolites are widely used in various catalytic applications, their use as modified sorbents is yet to be fully explored. The inventors envision that the characteristic large surface area and cavities that harbor heavy metal ions coupled with alkaline modification of USY zeolites may enhance the adsorption capacity.

In view of the forgoing, one object of the present disclosure is a sorbent device involving a porous membrane bag enclosing an alkaline-treated zeolite. Another object of the present disclosure is to provide a process for preparing the alkaline-treated zeolite. The present disclosure further describes a method for removing heavy metals, such as Cd(II), Cr(III), and Pb(II) ions, from an aqueous solution by employing the adsorbing properties of the sorbent device. It is demonstrated that the currently disclosed sorbent device effectively removes traces of heavy metals across a wide range of concentrations.

BRIEF SUMMARY OF THE INVENTION

According to a first aspect, the present disclosure relates to a sorbent device comprising an alkaline-treated zeolite, and a porous membrane bag encapsulating the alkaline-treated zeolite, wherein the alkaline-treated zeolite has a molar ratio of Si to Al in a range of 15:1-25:1.

In one embodiment, the alkaline-treated zeolite contains a faujasite zeolite.

In one embodiment, the alkaline-treated zeolite contains a USY zeolite.

In one embodiment, the alkaline-treated zeolite is in the form of particles having an average particle diameter in a range of 300-600 nm.

In one embodiment, the alkaline-treated zeolite has a BET surface area in a range of 680-750 m$^2$/g.

In one embodiment, the alkaline-treated zeolite has an average pore diameter in a range of 13-40 nm, and a total pore volume in a range of 0.8-1.2 cm$^3$/g.

In one embodiment, the porous membrane bag has an average pore size in a range of 0.05-0.5 μm.

In one embodiment, the porous membrane bag comprises at least one polymer selected from the group consisting of polypropylene, polyethylene, nylon, polyvinylidene fluoride, and polyethersulfone.

In a further embodiment, the porous membrane bag consists of polypropylene.

In one embodiment, the porous membrane bag includes a porous membrane having an average thickness in a range of 10-500 μm.

In one embodiment, 0.5-500 mg of the alkaline-treated zeolite is present per cm$^2$ exterior surface area of the porous membrane bag.

According to a second aspect, the present disclosure relates to a method of removing a heavy metal ion from an aqueous solution having an initial concentration of the heavy metal ion. The method involves the steps of contacting the aqueous solution with the sorbent device of the first aspect to form an aqueous mixture containing a heavy metal loaded sorbent device, and removing the heavy metal loaded sorbent device from the aqueous mixture, thereby obtaining an aqueous solution having a reduced concentration of the heavy metal ion compared to the initial concentration.

In one embodiment, the heavy metal is an ion of at least one heavy metal selected from the group consisting of Cr, Pb, and Cd.

In one embodiment, the aqueous solution has a pH in a range of 2-8.

In one embodiment, the initial concentration of the heavy metal in the aqueous solution is in a range of 0.1-50 mg L$^{-1}$.

In one embodiment, the alkaline-treated zeolite is present at a concentration in a range of 0.1-10 g per liter of the aqueous solution during the contacting.

In one embodiment, the sorbent device is contacted with the aqueous solution for 1-120 minutes.

In one embodiment, the sorbent device is contacted with the aqueous solution at a temperature in a range of 15-80° C.

In one embodiment, greater than 50% of a total mass of the heavy metal is removed from the aqueous solution.

In one embodiment, the method further involves the steps of treating the heavy metal loaded sorbent device with an acid to desorb the heavy metal and form a regenerated sorbent device, and using the regenerated sorbent device to remove a heavy metal from an aqueous solution.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
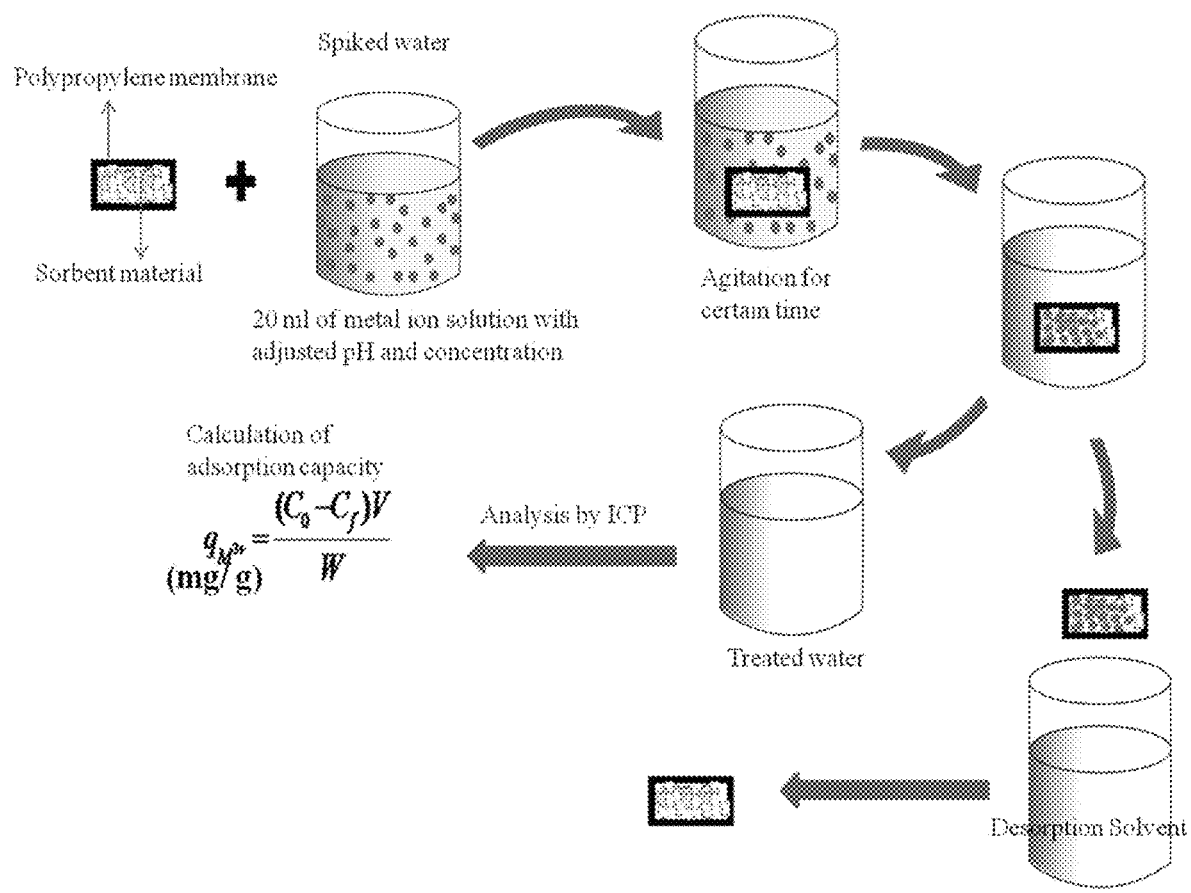
FIG. 1 is a schematic representation of removal of heavy metal ions from an aqueous solution using a sorbent device.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), or +/−15% of the stated value (or range of values). Within the description of this disclosure, where a numerical limit or range is stated, the endpoints are included unless stated otherwise. Also, all values and subranges within a numerical limit or range are specifically included as if explicitly written out.

The term "microporous" refers to a surface having an average pore diameter of less than 2 nm, while the term "mesoporous" refers to a surface having an average pore diameter of 2-50 nm.

According to a first aspect, the present disclosure relates to a sorbent device comprising an alkaline-treated zeolite and a porous membrane bag encapsulating the alkaline-treated zeolite.

As used herein, zeolites refer to porous aluminosilicate minerals that may be found in nature or produced industrially on a large scale. Zeolites are crystalline solid structures made of silicon, aluminum, and oxygen that form a framework with cavities and channels inside where cations, water, and/or small molecules may reside. Zeolites have a porous structure that can accommodate a wide variety of cations, such as $Na^+$, $K^+$, $Ca^{2+}$, $Mg^{2+}$ and others. These positive ions are rather loosely held and can readily be exchanged for others in a contact solution.

Several varied unique zeolite frameworks have been discovered, at present there are nearly 200 unique zeolite frameworks identified and over 40 naturally occurring zeolite frameworks are known. Zeolites are crystalline materials that afford molecular sized frames and pores, the major building units of zeolites are $[SiO_4]^{4-}$ and $[AlO_4]^{5-}$ tetrahedra. Zeolites are crystalline aluminosilicates with open three-dimensional framework structures built of $SiO_4$ and $AlO_4$ tetrahedra linked to each other by sharing all the oxygen atoms to form regular intra-crystalline cavities and channels of molecular dimensions. In a defining feature zeolite frameworks are made up of 4-coordinated atoms forming tetrahedra. These tetrahedra are linked together by their corners leading to a wide variety of structures. These units can link in several ways, resulting in arrays producing three-dimensional anionic networks. The extra negative charge on $[AlO_4]^{5-}$ tetrahedra is counter balanced by a cation, maintaining the overall neutrality of the zeolite. The framework structure may contain linked cages, cavities, and/or channels which are big enough for small molecules to enter and/or occupy.

As used herein, an "alkaline-treated zeolite," or "alkaline-modified zeolite" refers to a zeolite material obtained via alkaline-treatment (e.g., de-silication) of a zeolite mineral. In terms of the present disclosure, a variety of zeolite mineral species may be suitable to prepare the alkaline-treated zeolite. The zeolite structural group (Nickel-Strunz classification) includes, but is not limited to, 09.GA zeolites, 09.GB zeolites, 09.GC zeolites, 09.GD zeolites, 09.GE zeolites and mixtures thereof. The 09.GA zeolites with $T_5O_{10}$ units (T=combined Si and Al) are known as the fibrous zeolites and include, but are not limited to, the natrolite framework (NAT; gonnardite, natrolite, mesolite, paranatrolite, scolecite, tetranatrolite), the edingtonite framework (EDI; edingtonite, kalborsite), the thomsonite framework (THO; thomsonite series), and mixtures thereof. The 09.GB zeolites with chains of single connected 4-membered rings include, but are not limited to, the analcime framework (ANA; analcime, leucite, pollucite, wairakite), laumontite (LAU), yugawaralite (YUG), goosecreekite (GOO), montesommaite (MON), and mixtures thereof. The 09.GC zeolites with chains of doubly connected 4-membered rings include, but are not limited to, the phillipsite framework (PHI; harmotome, phillipsite series), the gismondine framework (GIS; amicite gismondine, garronite, gobbinsite), boggsite (BOG), merlinoite (MER), the mazzite series (MAZ), the paulingite series (PAU), perlialite (Linde type L framework, zeolite L, LTL), and mixtures thereof. The 09.GD zeolites with chains of 6-membered rings are known as tabular zeolites and include, but are not limited to, the chabazite framework (CHA; chabazite series, herschelite, willhendersonite, SSZ-13), the faujasite framework (FAU; faujasite series, Linde type X, zeolite X, X zeolites, Linde type Y, zeolite Y, Y zeolites), the mordenite framework (MOR; maricopaite, mordenite), the offretite-wenkite subgroup 09.GD.25 such as offretite (OFF) and wenkite (WEN), bellbergite (TMA-E, Aiello and Barrer, framework type EAB), bikitaite (BIK), the erionite series (ERI), ferrierite (FER), gmelinite (GME), the levyne series (LEV), the dachiardite series (DAC), epistilbite (EPI), and mixtures thereof. The 09.GE zeolites with chains of $T_{10}O_{20}$ tetrahedra (T=combined Si and Al) include, but are not limited to, the heulandite framework (HEU; clinoptilolite, heulandite series), the stilbite framework (STI; barrerite, stellerite, stilbite series); brewsterite framework (BRE; brewsterite series), and mixtures thereof. Other acceptable structural group frameworks may include, but are not limited to, cowlesite, pentasil (also known as ZSM-5, framework type MFI), tschernichite (beta polymorph A, disordered framework, BEA), Linde type A framework (zeolite A, LTA), and the like. Preferably, the alkaline-treated zeolite of the present disclosure is prepared using a zeolite with a faujasite (FAU) framework.

The silica and alumina tetrahedral of Y-type zeolites are connected by oxygen linkages. In order to impart thermal and hydrothermal stability, Y-zeolites may be subjected to treatment to knock off some framework alumina (one of these routes is steaming at high temperature). Typically Y-zeolites have a Si/Al ratio of about 2.5:1. The dealuminated Y-zeolite typically has a Si/Al ratio of 4:1 or more. The dealuminated Y-zeolite, with a higher framework Si/Al ratio, has stronger acid sites (isolated acid sites) and is thermally and hydrothermally more stable and is thus called ultrastable Y-zeolite (i.e., USY zeolite). Preferably, the alkaline-treated zeolite of the present disclosure is prepared using a zeolite comprising, consisting essentially of, or consisting of at least one zeolite selected from Y-type zeolites (e.g., Y, REY, CREY, USY), zeolite L, zeolite beta, and ZSM-5. Most preferably, the alkaline-treated zeolite is prepared using a USY zeolite.

The alkaline-treated zeolite may be prepared by the steps of (i) mixing the aforementioned zeolite (e.g., USY zeolite) with an alkaline solution to form a reaction mixture, (ii) collecting a precipitate from the reaction mixture, and (iii) drying the precipitate thereby forming the alkaline-treated zeolite.

The alkaline solution employed herein may be an aqueous solution containing at least one hydroxide base. Non-limiting examples of hydroxide base include alkali metal hydroxides (e.g., lithium hydroxide, sodium hydroxide, potassium hydroxide, rubidium hydroxide, and cesium hydroxide), alkali earth metal hydroxides (e.g., magnesium hydroxide, calcium hydroxide, strontium hydroxide, and barium hydroxide), and ammonium hydroxides (e.g., ammonium hydroxide, tetramethylammonium hydroxide, triethylammonium hydroxide, tetrabutylammonium hydroxide, tetrapropylammonium hydroxide, tetrapentylammonium hydroxide, and trimethylanilinium hydroxide). In preferred embodiments, the hydroxide base is tetrabutylammonium hydroxide (TBAOH), sodium hydroxide (NaOH), or both. Most preferably, the hydroxide base is a mixture of TBAOH and NaOH.

A concentration of the hydroxide base present in the alkaline solution may range from 0.05-1 M, preferably 0.1-0.5 M, preferably 0.15-0.4 M, preferably 0.2-0.35 M, preferably 0.25-0.3 M. Most preferably, the alkaline solution contains 0.1-0.2 M, or about 0.15 M TBAOH and 0.15-0.25 M, or about 0.2 M NaOH.

After the mixing, the resulting reaction mixture may be allowed to settle, or alternatively may be stirred, for example with a mechanical or magnetic stirrer. A precipitate may form at ambient temperatures (i.e., 20-25° C.), or alternatively upon optional heating to 30-80° C., 40-75° C., 50-70° C., or about 65° C. for 0.5-12 hours, 1-6 hours, 1.5-3 hours, or about 2 hours. An external heat source, such as a water bath or an oil bath, an oven, microwave, or a heating mantle, may be employed to heat the reaction mixture to facilitate the mixing/reacting.

To facilitate collection of the precipitate, the reaction mixture may be optionally cooled with an external cooling source such as an ice bath with or without salt, a water bath, a thermostatted thermocirculator, or air cooling. The precipitate may then be separated from the reaction mixture, for example by filtration, centrifugation, decantation, and the like, and optionally washed with water.

The precipitate may then be dried at a temperature of 20-150° C., preferably 25-120° C., preferably 40-110° C., preferably 50-100° C., preferably 60-80° C. under standard pressure or under vacuum for 0.1-24 hours, 0.5-12 hours, 1-6 hours, or 2-4 hours. In some embodiments, the precipitate may be dried at ambient temperatures (i.e., 20-25° C.) for 0.1-2 hours, or about 0.5 hours, followed by at an elevated temperature of 70-120° C., 90-115° C., or about 110° C. for 6-24 hours, or about 12 hours. The method may further involve calcining the dried mass in air e.g., within a furnace or oven at a temperature of 200-800° C., 300-700° C., 400-600° C., or about 550° C. for a period of 1-24 hours, 2-12 hours, 4-8 hours, or about 6 hours to form the alkaline-treated zeolite. Alternatively, the dried mass may not be heated in air, but oxygen-enriched air, an inert gas, or a vacuum.

Prior to the mixing, the zeolite (e.g., USY zeolite) may be calcined in the presence of air at a temperature of 200-800° C., 30-700° C., or about 550° C. In at least one embodiment, the aforementioned reaction mixture is devoid of phosphorus gypsum whisker, fly ash, or both.

In preferred embodiments, the alkaline-treated zeolite contains a zeolite with a faujasite structural group framework. In one or more embodiments, the alkaline-treated zeolite contains a zeolite having characteristics consistent with zeolites including Y-type zeolites (e.g., Y, REY, CREY, USY), zeolite L, zeolite beta, and ZSM-5. Preferably, the alkaline-treated zeolite contains a Y-type zeolite. In preferred embodiments, the alkaline-treated zeolite used herein contains a USY zeolite.

Often zeolites can be classified into groups according to the Si to Al molar ratio in their frameworks: i) "low silica" or aluminum rich zeolites A and X (Si to Al molar ratio Si/Al~1), ii) "intermediate silica" zeolites such as for example zeolite Y, mordenite, zeolite L, and natural zeolites (Si to Al molar ratio Si/Al 2 to 5), and iii) "high silica" zeolites such as zeolite beta and ZSM-5 (Si to Al molar ratio Si/Al≥10). The "low silica" zeolites represent a fortunate balance of composition, pore volume, and channel structure. These zeolites are nearly "saturated" in aluminum in the framework composition with a molar ratio of Si/Al from about 1 to about 1.5, which is considered the highest aluminum content possible in tetrahedral aluminosilicate frameworks. Consequently, they contain the maximum number of cation exchange sites balancing the framework aluminum, and thus the highest cation contents and exchange capacities. These compositional characteristics provide one of the most highly heterogeneous surfaces known among porous materials, due to exposed cationic charges nested in an aluminosilicate framework which results in high field gradients. Their surfaces are highly selective for water, polar, and polarizable molecules. The "intermediate silica" zeolites represent superior stability characteristics reflecting higher Si/Al molar ratios (2-5, preferably 2.5-4, preferably 3-3.5) that improve both thermal and acid stability as aluminum positions in the zeolite frameworks pose a site of instability to attack by acid and water vapor. In addition to improvement in stability the difference in composition and structures provide additional catalysis benefits. The "high silica" zeolites are zeolites with molar Si/Al ratios from 10 to 100 or higher, with distinct surface characteristics. In contrast to the "low" and "intermediate" silica zeolites, representing heterogeneous hydrophilic surfaces within a porous crystal, the surface of the high silica zeolites is more homogeneous with an organophilic-hydrophobic selectivity.

In one embodiment, the alkaline-treated zeolite of the present disclosure involves a material that is a low silica zeolite, an intermediate silica zeolite, or a high silica zeolite. In a preferred embodiment, the alkaline-treated zeolite involves a zeolite that is a high silica zeolite with a molar ratio of Si to Al in a range of 10:1-30:1, preferably 11:1-28:1, preferably 12:1-26:1, preferably 13:1-25:1, preferably 14:1-22:1, preferably 15:1-20:1, preferably 16:1-18:1, or about 17:1. In at least one embodiment, the alkaline-treated zeolite has a molar ratio of Si to Al smaller than 32:1, preferably up to 30:1, preferably up to 24:1, preferably up to 20:1, or about 17:1. Notably, the molar ratio of Si to Al of the alkaline-treated zeolite is up to 75% of that of an unmodified parent zeolite (i.e., the zeolite used to prepare the alkaline-treated zeolite), preferably up to 70%, preferably up to 50%, preferably up to 30% of that of the unmodified parent zeolite.

A particle is defined as a small object that behaves as a whole unit with respect to its transport and properties. An average diameter (e.g., average particle size) of the particle, as used herein, and unless otherwise specifically noted, refers to the average linear distance measured from one point on the particle through the center of the particle to a point directly across from it. For polygonal shapes, the term "diameter", as used herein, and unless otherwise specified, refers to the greatest possible distance measured from a vertex of a polygon through the center of the face to the vertex on the opposite side. For a circle, an oval, an ellipse, and a multilobe, "diameter" refers to the greatest possible distance measured from one point on the shape through the center of the shape to a point directly across from it.

The alkaline-treated zeolite of the present disclosure may be in the form of particles of the same shape or different shapes, and of the same size or different sizes. In one or more embodiments, the alkaline-treated zeolite is in the form of particles having an average particle diameter in a range of 275-625 nm, preferably 300-600 nm, more preferably 400-550 nm, even more preferably 450-500 nm.

Figure 3A:
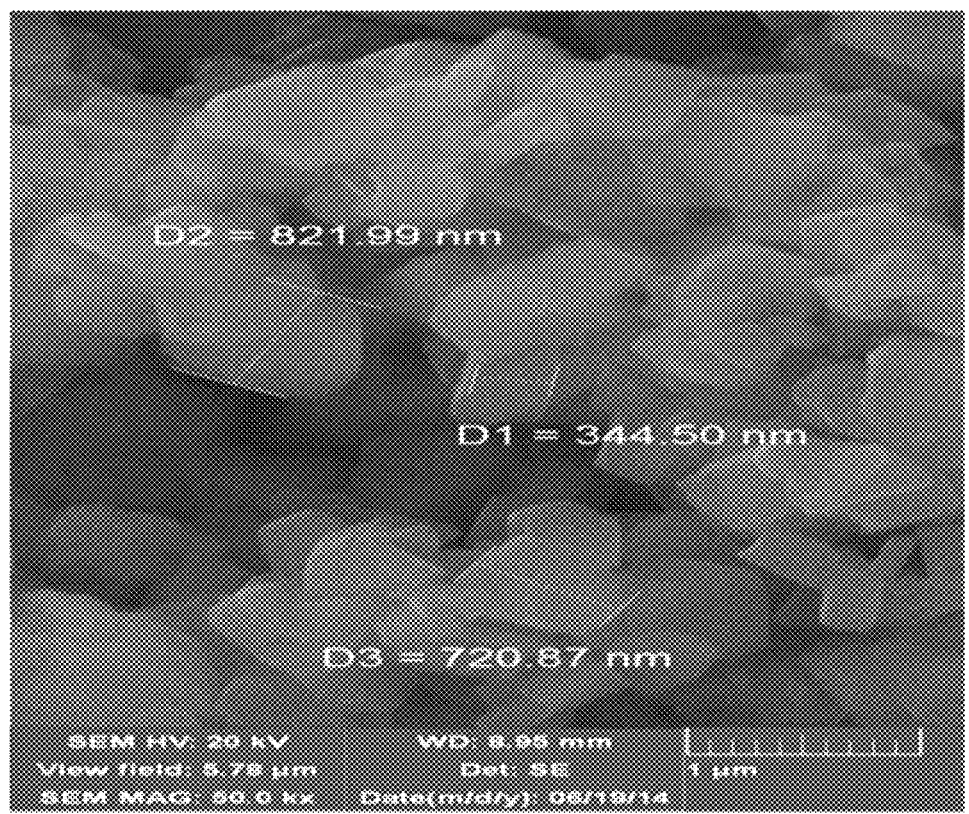
FIG. 3A is a scanning electron microscopy (SEM) image of unmodified zeolite (SDUSY40).
Figure 3B:
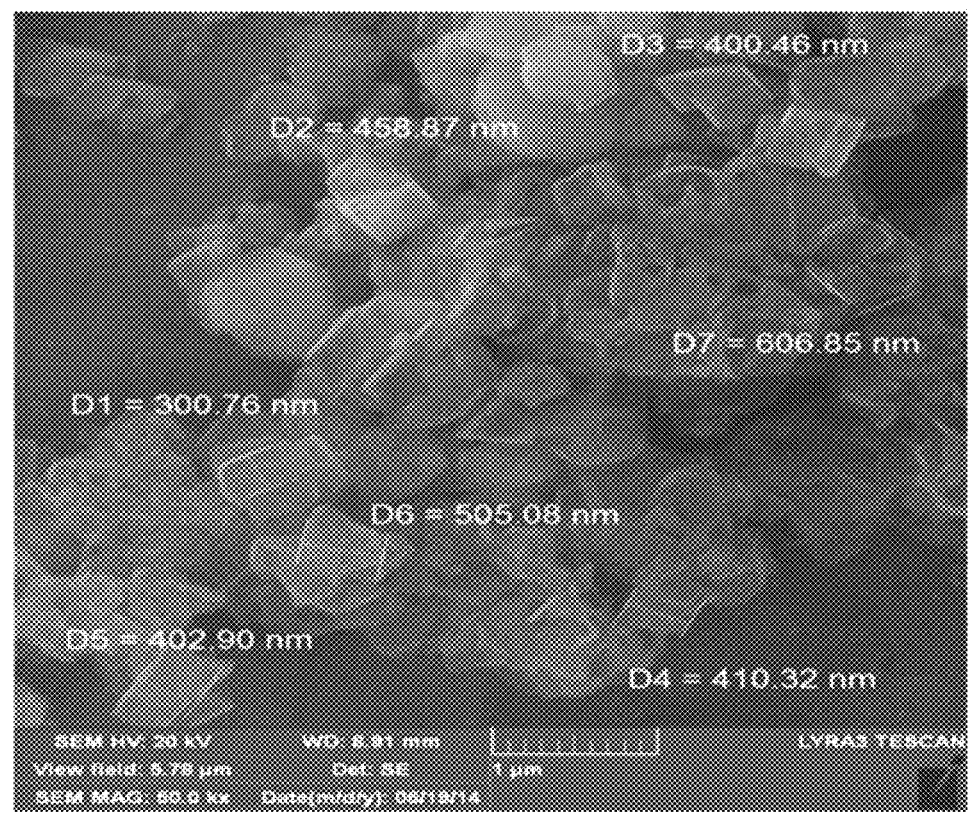
FIG. 3B is a SEM image of alkaline-treated zeolite (AT-SDUSY).

The alkaline-treated zeolite particles may have a polyhedron shape, such as a rectangular shape, an octahedral shape, a prismatic shape (e.g., a hexagonal prism, a triangular prism), and a pyramidal shape (e.g., a triangular-based pyramid, a square-based pyramid), and other polyhedron shapes. Alternatively, the alkaline-treated zeolite particles have a combination of planar sides with rounded edges or corners. Preferably, the alkaline-treated zeolite particles are in the form of octahedrons having a microscopically smooth surface. As shown in FIG. 3B, the alkaline-treated zeolite particles are substantially free of uneven/rough surface having any irregular contour that is cracked, bumpy, jagged, spiky, serrated, or zigzag.

The Brunauer-Emmet-Teller (BET) theory (S. Brunauer, P. H. Emmett, E. Teller, *J. Am. Chem. Soc.* 1938, 60, 309-319, incorporated herein by reference) aims to explain the physical adsorption of gas molecules on a solid surface and serves as the basis for an important analysis technique for the measurement of a specific surface area of a material. Specific surface area is a property of solids which is the total surface area of a material per unit of mass, solid or bulk volume, or cross sectional area. In most embodiments, pore diameter, pore volume, and BET surface area are measured by gas adsorption analysis, preferably $N_2$ adsorption analysis (e.g. $N_2$ adsorption isotherms).

In one or more embodiments, the alkaline-treated zeolite used herein has a BET surface area in a range of 650-800 $m^2/g$, preferably 680-750 $m^2/g$, preferably 690-740 $m^2/g$, preferably 700-735 $m^2/g$, preferably 705-730 $m^2/g$, preferably 710-725 $m^2/g$, preferably 715-720 $m^2/g$. In at least one embodiment, the alkaline-treated zeolite has a BET surface area greater than 607 $m^2/g$, preferably greater than 615 $m^2/g$, preferably greater than 650 $m^2/g$, preferably greater than 700 $m^2/g$, or about 720 $m^2/g$. Notably, the BET surface area of the alkaline-treated zeolite is at least 10% greater than that of an unmodified parent zeolite (i.e., the zeolite used to prepare the alkaline-treated zeolite), preferably 15% greater, preferably 20% greater, preferably 40% greater than that of the unmodified parent zeolite.

In one or more embodiments, the alkaline-treated zeolite has an average pore diameter in a range of 13-40 nm, preferably 14-38 nm, preferably 15-36 nm, preferably 16-34 nm, preferably 17-32 nm, preferably 18-31 nm, preferably 20-30 nm, preferably 22-28 nm, preferably 24-26 nm. In a related embodiment, the alkaline-treated zeolite has a total pore volume in a range of 0.7-1.4 cm$^3$/g, preferably 0.8-1.2 cm$^3$/g, preferably 0.85-1.15 cm$^3$/g, preferably 0.9-1.1 cm$^3$/g, preferably 0.95-1.05 cm$^3$/g, or about 1.0 cm$^3$/g.

As mentioned previously, the alkaline-treated zeolite is enclosed within a porous membrane bag. The porous membrane bag permits the perfusion of solutions (e.g., solvent, heavy metal ions), while confining solids (e.g., zeolite) and interferences within the porous membrane bag.

In one embodiment, the porous membrane bag of the present disclosure comprises at least one polymer selected from the group consisting of polypropylene, polyethylene, nylon, polyvinylidene fluoride, and polyethersulfone. In a further embodiment, the porous membrane bag may comprise, consist essentially of, or consist of polypropylene (PP), though other synthetic membranes with similar thickness and porosity may be used. Polypropylene may be a homopolymer or a copolymer, such as a block copolymer or random copolymer. Conveniently, a commercially available polypropylene (e.g., a polypropylene sheet available from Membrana (Wuppertal, Germany)) may be used. In an alternative embodiment, the porous membrane bag may comprise more than one polymer. For example, the porous membrane bag may be composed of both polypropylene and polyethylene with a polypropylene to polyethylene weight ratio range of 1:10-10:1, preferably 1:5-5:1, more preferably 1:2-2:1, or about 1:1.

In one embodiment, the porous membrane bag of the present disclosure comprises a porous membrane having an average thickness that may range from 5, 10, 25, 50, 60, 70, 80, 90, 100, 110, 120, 130, 140, 150, 160, 170, 180, 190, 200, 300, 400, 500, 600, 700, 800, 900, or 1,000 μm, preferably the average thickness is in the range of 10-500 μm, more preferably 50-250 μm, even more preferably 100-180 μm, or about 157 μm. The porous membrane may have an average pore size ranging from 0.01, 0.05, 0.10, 0.15, 0.16, 0.17, 0.18, 0.19, 0.20, 0.21, 0.22, 0.23, 0.24, 0.25 μm, 0.30 μm, 0.35 μm, 0.40 μm, 0.45 μm, 0.50 μm, 0.60 μm, 0.70 μm, or 0.8 μm, preferably the average pore size is in a range of 0.05-0.5 μm, 0.075-0.4 μm, 0.10-0.35 μm, 0.15-0.3 μm, or about 0.20 μm.

In one embodiment, the porous membrane forming the porous membrane bag has a uniform thickness of about 157 μm and a pore size of about 0.2 μm. In some embodiments, a polypropylene bag may be replaced by a porous bag made of a different kind of plastic or semipermeable membrane. Preferably the porous membrane has a uniform thickness and pore size that does not vary by more than 0.1, 0.2, 0.5, 1, 2, 3, 4, 5, 6, 7, 8, 9, or 10% over an external surface of the porous membrane.

The porous membrane bag may be formed by a single layer of the membrane without additional membranous layers, coatings, films, filtration assemblies, holders, or other external components since a single layer of the porous membrane provides for more rapid and complete perfusion of solutions (e.g., solvent, heavy metal ions). Thus, for use, it may be unnecessary to insert the membrane bag into a frame, carrier, filter cartridge assembly, or other mechanical device to affix a filter. However, in some alternative embodiments, two, three, or more layers of porous membrane or may be used to form a membrane bag or the porous membrane bag may be incorporated as part of a larger system comprising other elements such as filters, holders, or other external components.

In one embodiment, the porous membrane bag has a shape that is triangular, tetrahedral, square, cubic, rectangular, parallelepiped, circular, spherical, pouch-like (e.g., a tea-bag shaped bag), sachet-like, purse-like, or other shape that prevents release of the alkaline-treated zeolite and interferences from the porous membrane bag. In some embodiments, two or more porous membranes are sealed together to produce the porous membrane bag, for example, two rectangular or square-shaped porous membranes may have the alkaline-treated zeolite placed between their surfaces and then sealed to produce a membrane bag. In another embodiment, two circular or oval-shaped membranes may be loaded with the alkaline-treated zeolite and sealed to produce a circular or oval-shaped pod. In other embodiments, only a single membrane will be used to produce a porous membrane bag enclosing the alkaline-treated zeolite. Typically the porous membrane bag permanently seals in the alkaline-treated zeolite so as to prevent its accidental escape into the bulk of a solution.

In related embodiments, the porous membrane bag may comprise a membrane in the shape of a tube, for example, a hollow fiber membrane, where the ends of the tube are closed in order to contain the alkaline-treated zeolite. The edges may be closed by an adhesive, a clamp, a tie, or by heat sealing. Alternatively, the membrane bag may form a rectangular pillow shape around the alkaline-treated zeolite. In other embodiments, the edges or perimeter of the porous membrane may be sealed with an adhesive or folded and mechanically sealed, for example with stitching or stapling. In this embodiment, the four edges may be sealed along each edge, or one edge may be a fold in the membrane with the remaining edges being sealed along each edge. In this pillow shape, the edges may measure 0.4-2 cm, preferably 0.6-1.5 cm, more preferably 0.7-1 cm in length, and the height may be 0.4-2 cm, preferably 0.6-1.5 cm, more preferably 0.7-1 cm. In one embodiment, the length may be about 0.8 cm, and the height may be about 0.8 cm. However, in some embodiments, one or more edges may be less than 0.4 cm or greater than 2 cm.

The porous membrane bag may hold a maximum volume of 0.05-5 cm$^3$, preferably 0.1-1 cm$^3$, more preferably 0.25-0.75 cm$^3$ of a sample. In one embodiment, 0.5-500 mg of the alkaline-treated zeolite is present per cm$^2$ exterior surface area of the porous membrane bag. In other embodiments, preferably 0.7-100 mg, more preferably 1.0-50 mg, more preferably 1.5-25 mg, more preferably 5-20 mg, more preferably 10-15 mg of the alkaline-treated zeolite is present per cm$^2$ exterior surface area of the porous membrane bag.

According to a second aspect, the present disclosure relates to a method of removing a heavy metal ion from an aqueous solution having an initial concentration of the heavy metal ion. The method involves the steps of (i) contacting the aqueous solution with the sorbent device of the first aspect to form an aqueous mixture containing a heavy metal loaded sorbent device, and (ii) removing the heavy metal loaded sorbent device from the aqueous mixture, thereby obtaining an aqueous solution having a reduced concentration of the heavy metal ion compared to the initial concentration.

Non-limiting examples of aqueous solutions (i.e. heavy metal contaminated aqueous solutions), water sources and systems include, but are not limited to, surface water that collects on the ground or in a stream, aquifer, river, lake, reservoir or ocean, ground water that is obtained by drilling wells, run-off, industrial water, public water storage towers, public recreational pools and/or bottled water. In one embodiment, the aqueous solution is a contaminated water mixture. The contaminated water mixture may come from an ocean, a bay, a river, a lake, a swamp, a pond, a pool, a fountain, a bath, an aquarium, a petroleum extraction or processing site, a water treatment plant, a sewage treatment plant, a desalination plant, a manufacturing plant, a chemical plant, a textile plant, a power plant, a gas station, or some other place that may generate heavy metal contaminated water mixtures. Methods for removing heavy metals from aqueous solutions according to the present disclosure include contacting the sorbent device of the present disclosure in any of its embodiments with heavy metal contaminated water sources and systems. The methods may be carried out in tanks, containers (e.g., a beaker), or small scale applications in both batch mode and fixed-bed or column mode.

Exemplary metal ions that can be adsorbed by the sorbent device of the present disclosure are of a wide range and include, but are not limited to, ions of Ag, Na, Pb, Mn, Fe, Co, Ni, Cu, Sn, Cd, Hg, Cr, Fe, As, Sb, Cr, Zn, V, Pt, Pd, Rh and mixtures thereof in various oxidation states such as +1, +2 and +3. Further, these metal ions may be of any oxidation state $M^{+1}$, $M^{+2}$, $M^{+3}$, etc. In a preferred embodiment, the heavy metal applicable to the present method is an ion of at least one heavy metal selected from the group consisting of Cr, Pb, and Cd. It is equally envisaged that the alkaline-treated zeolite of the sorbent device may be adapted or chemically modified to adsorb, incorporate and/or bind additional metal ions in addition to, or in lieu of the aforementioned heavy metal ions and may bind selectively or collectively. In one embodiment, the additional metal ion may be any ion which is suitably coordinated by the composite disclosed herein in any of its embodiments. Exemplary additional metal ions include, but are not limited to, ions of an alkali metal (Li, Na, K, etc.), an alkaline earth metal (Mg, Ca, Sr, etc.), a lanthanide metal (La, Ce, Eu, Yb, etc.), an actinide metal (Ac, Th, etc.), or a post-transition metal (Al, Sn, In, etc.). Preferably the additional metal ion is a transition metal ion, most preferably a heavy metal ion.

As used herein, adsorption is the adhesion of atoms, ions or molecules from a gas, liquid, or dissolved solid to a surface. The process creates a film of an adsorbate (i.e. heavy metal ions) on the surface of an adsorbent (i.e. the sorbent device, the alkaline-treated zeolite). This process differs from absorption, in which a fluid (the absorbate) permeates or is dissolved by a liquid or solid (the absorbent). Adsorption is a surface-based process while absorption involves the whole volume of the material. The term sorption encompasses both processes, while, desorption is the reverse of it. As used herein, chemisorption is a kind of adsorption which involves a chemical reaction between the adsorbate and adsorbent. New chemical bonds are generated at the adsorbent surface. In contrast with chemisorption is physisorption, which leaves the chemical species of the adsorbate and adsorbent intact and the electronic structure of the atom or molecule is barely perturbed upon adsorption. In terms of the present disclosure, the adsorption may be chemisorption, physisorption, or mixtures thereof. In at least one embodiment, the heavy metal ions are removed by chemisorption with the sorbent device of the current disclosure.

In one or more embodiments, the alkaline-treated zeolite in the sorbent device of the current disclosure is present in the aqueous solution at a concentration in the range of 0.1-20 grams per liter volume of the aqueous solution during the contacting, preferably 0.2-15 g $L^{-1}$, preferably 0.25-10 g $L^{-1}$, preferably 0.5-5 g $L^{-1}$, preferably 0.625-2.5 g $L^{-1}$, preferably 1-2 g $L^{-1}$, or about 1.25 gram per liter volume of the aqueous solution during the contacting.

In one or more embodiments, the method for removing heavy metal is carried out in an aqueous solution with a pH in the range of 2 to 8, preferably a pH in the range of 3 to 7, preferably a pH in the range of 4 to 6. In a most preferred embodiment, the method for removing heavy metal of the current invention is carried out in an aqueous solution with a pH of about 6.

In one or more embodiments, the sorbent device of the present disclosure is effective in adsorbing heavy metal ions in an aqueous solution within a temperature range of 4-150° C., preferably 8-120° C., preferably 10-100° C., preferably 12-90° C., preferably 15-80° C., preferably 20-60° C., preferably 30-50° C. In a preferred embodiment, the sorbent device is contacted with the aqueous solution at a temperature in the range of 20-55° C., preferably 25-50° C., preferably 35-45° C.

In one or more embodiments, the sorbent device of the present disclosure is contacted with the aqueous solution for 0.1 to 24 hours, preferably 0.25-12 hours, preferably 0.5-8 hours, preferably 0.75-6 hours, preferably 1-3 hours, preferably 1.5-2 hours. Preferably, the sorbent device is contacted with the aqueous solution for 1-60 minutes, preferably 5-45 minutes, preferably 10-40 minutes, preferably 15-35 minutes, preferably 20-30 minutes, or about 25 minutes.

The heavy metal adsorption capacity of the sorbent device of the present disclosure may increase as the initial concentration of heavy metal ions in aqueous solution increases. In one or more embodiments, the sorbent device is effective in removing heavy metal from aqueous samples wherein the initial concentration of the heavy metal ion, preferably Cr(III), Pb(II), and/or Cd(II), in the aqueous solution is in the range of 0.01-5,000 mg $L^{-1}$, preferably 0.1-1,000 mg $L^{-1}$, preferably 0.5-500 mg $L^{-1}$, preferably 1-250 mg $L^{-1}$, preferably 5-200 mg $L^{-1}$, preferably 10-100 mg $L^{-1}$, preferably 20-80 mg $L^{-1}$, preferably 30-60 mg $L^{-1}$, preferably 40-50 mg $L^{-1}$. Most preferably, the initial concentration of the heavy metal in the aqueous solution ranges from 0.1 to 50 mg $L^{-1}$, preferably 1-25 mg $L^{-1}$, preferably 5-10 mg $L^{-1}$.

In one or more embodiments, the alkaline-treated zeolite present in the sorbent device of the present invention has an adsorption capacity of at least 0.1 mg of heavy metal per gram of the alkaline-treated zeolite, preferably at least 0.5 mg $g^{-1}$, preferably at least 1 mg $g^{-1}$, preferably at least 2 mg $g^{-1}$, preferably at least 5 mg $g^{-1}$, preferably at least 10 mg $g^{-1}$, preferably at least 20 mg $g^{-1}$, preferably at least 30 mg $g^{-1}$, preferably at least 40 mg $g^{-1}$, preferably at least 50 mg of heavy metal per gram of the alkaline-treated zeolite. Notably, adsorption capacity of a sorbent device containing an unmodified parent zeolite (i.e., the zeolite used to prepare the alkaline-treated zeolite) is at least 50% smaller than that of the currently disclosed sorbent device, preferably 60% smaller, preferably 70% smaller, preferably 75% smaller, preferably 80% smaller, preferably 90% smaller than that of the sorbent device.

In a preferred embodiment, the alkaline-treated zeolite has an adsorption capacity in the range of 2-100 mg of Cr(III) per gram of the alkaline-treated zeolite, preferably 4-50 mg $g^{-1}$, preferably 10-40 mg $g^{-1}$, preferably 20-30 mg of Cr(III) per gram of the alkaline-treated zeolite. In another preferred embodiment, the alkaline-treated zeolite has an adsorption capacity in the range of 1-75 mg of Pb(II) per gram of the alkaline-treated zeolite, preferably 2-40 mg g$^{-1}$, preferably 5-30 mg g$^{-1}$, preferably 10-20 mg of Pb(II) per gram of the alkaline-treated zeolite. In another preferred embodiment, the alkaline-treated zeolite has an adsorption capacity in the range of 0.4-50 mg of Cd(II) per gram of the alkaline-treated zeolite, preferably 1-25 mg g$^{-1}$, preferably 3-15 mg g$^{-1}$, preferably 5-10 mg of Cd(II) per gram of the alkaline-treated zeolite.

In one or more embodiments, greater than 30% of a total mass of the heavy metal is removed from the aqueous solution at the end of the adsorption process following contacting, preferably greater than 40%, preferably greater than 50%, preferably greater than 60%, preferably greater than 70%, preferably greater than 80%, preferably greater than 90%, preferably greater than 92%, preferably greater than 94%, preferably greater than 96%, preferably greater than 97%, preferably greater than 98%, preferably greater than 99% of a total mass of the heavy metal is removed from the aqueous solution at the end of the adsorption process following contacting.

Adsorption is a key mechanism of removing heavy metals in the present disclosure, which requires contact between the adsorbent material (i.e., the sorbent device) and the target adsorbate (heavy metal ions). Preferably, at least 75%, preferably at least 90%, more preferably at least 97%, even more preferably about 100% of the exterior surface area of the porous membrane bag is in contact with the aqueous solution.

There is generally an increase in the removal efficiency with increasing agitation speed until a certain level. In certain embodiments, the method further comprises agitation of the aqueous solution before, during or after the contacting. The agitation may encompass shaking, stirring, rotating, vibrating, sonication and other means of increasing contact between the sorbent device of the current invention (e.g., the alkaline-treated zeolite) and heavy metal ions. Further, the agitation can be performed manually or mechanically. In one embodiment, the treatment and contacting process may be enhanced by mechanical shaking or agitation, preferably by a bath shaker at a speed of up to 1000 rpm, preferably up to 750 rpm, preferably up to 500 rpm, preferably 50-450 rpm, preferably 75-375 rpm, preferably 100-300 rpm in order to increase contact between the sorbent device and heavy metal ions.

In a preferred embodiment, the method further comprises recovering and reusing the heavy metal loaded sorbent device. In certain embodiments, the heavy metal loaded sorbent device may be obtained directly from the aqueous solution or via methods including, but not limited to, filtration, centrifugation, evaporation, heated evaporation and the like, preferably filtration or centrifugation, most preferably filtration. In certain embodiments, the obtained heavy metal loaded sorbent device may be washed several times with an appropriate solvent to remove all materials present after each round of heavy metal absorption before being regenerated and reused and/or recycled in another round of removal of heavy metal ions from an aqueous solution.

In one or more embodiments, the method further comprises (i) treating the heavy metal loaded sorbent device with an acid to desorb the heavy metal and form a regenerated sorbent device, and (ii) using the regenerated sorbent device to remove a heavy metal from an aqueous solution.

In this manner the sorbent device can be regenerated and/or reused in another contacting, adsorbing and removal. In one embodiment, metal ions are desorbed from the alkaline-treated zeolite (or the heavy metal loaded sorbent device) by treating or immersing the heavy metal loaded sorbent device in an acidic solution of 0.25-5.0 M in concentration, preferably 0.5-2.5 M, preferably 1.0-2.0 M in concentration for up to 24 hours, preferably up to 2 hours, preferably up to 1 hour, preferably up to 30 minutes, preferably up to 15 minutes, preferably up to 5 minutes, preferably up to 2 minutes, with optionally applied agitation such as ultra-sonication. Strong acids including, but not limited to, HCl, $H_2SO_4$, and $HNO_3$ are preferred, but organic acids and weak acids (i.e. acetic acid) may also be used in the desorption process, most preferably the acid is $HNO_3$. In one embodiment, treating the heavy metal loaded sorbent device with the acid desorbs at least 50% of the total mass of the heavy metal loaded, preferably at least 75%, preferably at least 90%, preferably at least 95%, preferably at least 99% of the total mass of the heavy metal loaded.

The sorbent device of the present disclosure may be regenerated (i.e. desorbed) and reused up to 2 cycles without a loss of greater than 10%, preferably 5%, more preferably 1% in the adsorption capacity, preferably up to 3 cycles, preferably up to 4 cycles, preferably up to 5 cycles, preferably up to 10 cycles, preferably up to 25 cycles, preferably up to 50 cycles, preferably up to 100 cycles.

The examples below are intended to further illustrate procedures for preparing and characterizing the sorbent devices of the present invention, and assessing the method for heavy metal removal using these sorbent devices. They are not intended to limit the scope of the claims.

Example 1

Reagents, Instruments, and Materials

All reagents used were of analytical grade. Sodium hydroxide, (NaOH, 97+%, Aldrich), tetrabutyl ammonium hydroxide (TBAOH, 40 wt. % in $H_2O$, Sigma-Aldrich), and nitric acid, ($HNO_3$, J. T. Baker (Philips Burg, NJ). The ultrapure water (pH=5.6) was prepared using Milli-Q (Milford, MA) system. The lead (Pb), cadmium (Cd), and chromium (Cr) standard solutions were obtained from CPI International.

The instruments used included the Double Leopard 16-inch Hand Sealer (Impulse) machine, Bransonic 32 Ultrasonic bath (Dimension bath D*H*W=15*14*30 cm), magnetic stirrer, and Metrohm 691 pH/ion meter with a combined glass-calomel electrode. Other instruments for characterization and analysis included FTIR, SEM, Adsorption analyzer, XRD, ICP-OES.

Prior to use, all glassware and plastic bottles were thoroughly cleaned by soaking in 10% ultrapure $HNO_3$ for 12 hours and then rinsed with ultrapure water. The plastic bottles were employed for removal experiments while glassware was used for preparation of calibration standards. Apart from the above-mentioned step, prior to use, the glassware was further cleaned by washing with 10% ultrapure $HNO_3$ several time and then used immediately. The polypropylene membrane sheet (157 µm thickness and 0.2 µm pore size) was purchased from Membrana (Wuppertal, Germany). The USY (Si/Al=40) zeolite used in this study was supplied by Zeolyst International. Prior to post-synthetic treatments, the as-received USY zeolite (coded SDUSY40) was air-calcined at 550° C. for 6 hours (5° C./min), so as to ascertain its proton form (H-form).

Example 2

Preparation of Working Samples

A wide range of working solutions was made by spiking aliquots of typically 20 mL ultra-pure water with different known concentrations of target analytes and subsequently adjusted to different pH using 0.1 M NaOH and 0.1 M $HNO_3$. Thereafter, removal experiments were conducted on these samples using modified zeolite containing membrane bag.

Example 3

Alkaline Treatment of Zeolite

The modification of the H-form of SDUSY40 zeolite was performed as follows. An alkaline solution (50 mL) containing a mixture of 0.15 M TBAOH and 0.20 M NaOH was heated up to a desired temperature (65° C.) in a flask, inside oil bath under reflux. Then, 1.5 g of SDUSY40 was added to the heated alkaline solution and the mixture was stirred at the temperature (65° C.) for 2 hours, under atmospheric pressure. Afterwards, the SDUSY40 suspension was cooled using an ice bath, and subsequently the alkaline treated SDUSY40 was isolated by suction filtration. The solid product (residue) was washed with 400 mL deionized water to reach neutral pH, and then dried at ambient temperature for 30 min, followed by drying at 110° C. overnight. Afterwards, the alkaline treated sample (coded "AT-SDUSY") was air-calcined at 550° C. for 6 hours (3° C./min) and then characterized and evaluated for sorption of metal ions.

Example 4

Characterization of Zeolite Materials

Both the SDUSY40 and AT-SDUSY samples were characterized using spectroscopic and imaging techniques. The FTIR (Nicolet 6700 spectrometer-Thermo electron, USA), provided by OMNIC with a deuterated triglycine sulfate (DTGS) detector, was used to establish the functional groups present in the zeolite samples. The samples were made into pellets with the addition of KBr, and the spectra were then obtained using transmittance mode within 400-4000 $cm^{-1}$ wave number range. For each sample, a spectrum was collected for 16 scans with resolution of 2 $cm^{-1}$ for the background noise correction.

Rigaku Miniflex II X-ray diffraction (XRD powder system using CuKα radiation ($\lambda_{K\alpha1}$=1.54051 Å, 30 kV and 15 mA), was employed to give the crystallinity and structural parameters of the zeolite materials. The high-angle XRD spectra were obtained in the static scanning mode in the range from 5° to 60° (2θ) at a step size of 0.02° and a detector angular speed of 2°/min.

Textural parameters, including surface area, pore volume, and average pore diameter, were determined from the $N_2$ physisorption measurements at 77 K, using Micromeritics ASAP2020 adsorption analyzer. At first, samples were degassed at 220° C. under vacuum ($10^{-5}$ Torr) for 3 hours prior to $N_2$ adsorption-desorption measurements. The Brunauer-Emmett-Teller (BET) specific surface areas were determined from the adsorption data in the relative pressure ($P/P_0$) range of 0.06-0.30, while the contributions of micropores and mesopores were derived from the t-plot method as firstly described by Lippens and de Boer (1965) [B. C. Lippens, J. H. de Boer, Studies on pore systems in catalysts: V. The t method, J. Catal. 4 (1965) 319-323, incorporated herein by reference in its entirety]. In addition, the pore size distribution was calculated using the Barret-Joyner-Halenda (BJH) model in the adsorption branch of the isotherm [T. A. Saleh, K. O. Sulaiman, S. A. AL-Hammadi, H. Dafalla, G. I. Danmaliki, Adsorptive desulfurization of thiophene, benzothiophene and dibenzothiophene over activated carbon manganese oxide nanocomposite: with column system evaluation, J. Clean. Prod. 154 (2017) 401-412, incorporated herein by reference in its entirety].

The particle size and morphology of the sorbent were obtained from the images recorded in the scanning electron microscopy using Tescan Lyra-3 consisting of both high-end field-emission scanning electron microscope (FESEM) and high-performance focused ion beam (FIB) system in one chamber. Furthermore, the inductively coupled plasma optical emission spectroscopy (ICP-OES) Horiba ULTIMA 2 instrument was used to determine the concentration of elements.

Example 5

Fabrication of Sorbent Containing Porous Membrane Bag

The polypropylene membrane sheet was carefully cut and heat-sealed to make a tea-bag-like envelope with an open end. 25 mg of sorbent was packed into the envelop that was then heat-sealed. To ensure consistency in the weight measurement, each bag was re-weighed and the edges were trimmed carefully. A ca. ±0.02 mg weight difference in the packaged bag devices was considered acceptable in the present disclosure.

Example 6

Procedure for Removal of Heavy Metals

The adsorption procedure began with the conditioning of the sorbent contained in porous membrane bag in acetone for 10 min. This step not only conditioned the sorbent but also opened the pores of the membrane. The membrane bag was then dried with lint-free tissue and placed in 10 mL of ultra-pure water in a glass vial. Henceforth, a pair of tweezers was used to handle the bag device in the remaining adsorption and desorption steps.

For the adsorptive removal, the sorbent containing bag was immersed in 20 ml of water sample spiked with known concentrations of heavy metal ions and agitated at 1,200 rpm for a chosen period (see FIG. 1). The vial containing the sample, sorbent bag, and magnetic stirrer was sealed with a cap and positioned inside the water bath system to maintain a stable temperature for isotherm adsorption evaluation.

Example 7

Analysis of the Treated Water, Sorbent Regeneration, and Recovery of the Heavy Metal Ions In order to evaluate the removal efficiency of the adsorbent, treated water samples were analyzed for remaining heavy metal ions by ICP-OES. The adsorbed heavy metals were recovered/desorbed by placing the sorbent containing bag in small vials having 2 mL of 1M $HNO_3$ for 5 min under sonication. This choice of desorbing solvent was made to conform to the matrix standard for elemental analysis using ICP-OES. Subsequently, the reusability of the sorbent bag was investigated in recovery equilibrium experiments at a fixed time interval for three cycles. For each cycle, the solutions were separately analyzed for heavy metal ions content, measured in triplicates by ICP-OES.

The inductively coupled plasma optical emission spectroscopy (ICP-OES) Horiba ULTIMA 2 instrument was used to determine the concentration of elements in the present disclosure. The analysis was based on an external calibration which was built by employing the calibration standards (n=6) prepared in 2% ultrapure aqueous solution of $HNO_3$ in the range of 0.1 to 10 mg/L. The same 2% ultrapure aqueous solution of $HNO_3$ was used as a calibration blank. The procedural blanks were also prepared along with each set of removal experiments and then subtracted from the metal concentrations in the samples. The instrumental detection limits (IDLs) for Cr, Cd, and Pb were 5.0, 5.0, and 50 µg/L respectively.

Example 8

Instrumental and Data Analysis

Removal efficiency and sorption capacity of AT-SDUSY sorbent was computed using the following equations 1 and 2:

$$\text{Removal efficiency (\%)} = \frac{(C_o - C_e) \times 100}{C_o} \quad \text{Eq. 1}$$

$$q_e = \frac{(C_o - C_e) \times V}{m} \quad \text{Eq. 2}$$

where $q_e$ is the amount of adsorbed metal ions (mg/g), $C_o$ and $C_e$ are the initial and equilibrium concentration of the metal ions in the sample solution (mg/L), respectively, m is the adsorbent mass (mg), and V is the sample volume (mL).

The results obtained from the calculations were further used to analyze kinetics and isotherm studies, and the results were subsequently presented for discussions.

Example 9

Characterization of the SDUSY40 and AT-SDUSY Sorbent Materials

Several characterization techniques were used to reveal the textural, structural, and morphological properties of the sorbent materials. FTIR spectra showed amongst other, a broad peak at wave number ca. 3400 $cm^{-1}$ that indicated the presence of the —OH stretching, while the peaks at ca. 2900 $cm^{-1}$ represented a C—H saturated aliphatic hydrocarbon of chain mode, and the peak at around 2360 $cm^{-1}$ could be attributed to an amine group present only in the AT-SDUSY sample. Importantly, the spectra clearly indicated the presence of enhanced hydroxy group in the AT-SDUSY sorbent material.

Figure 2:
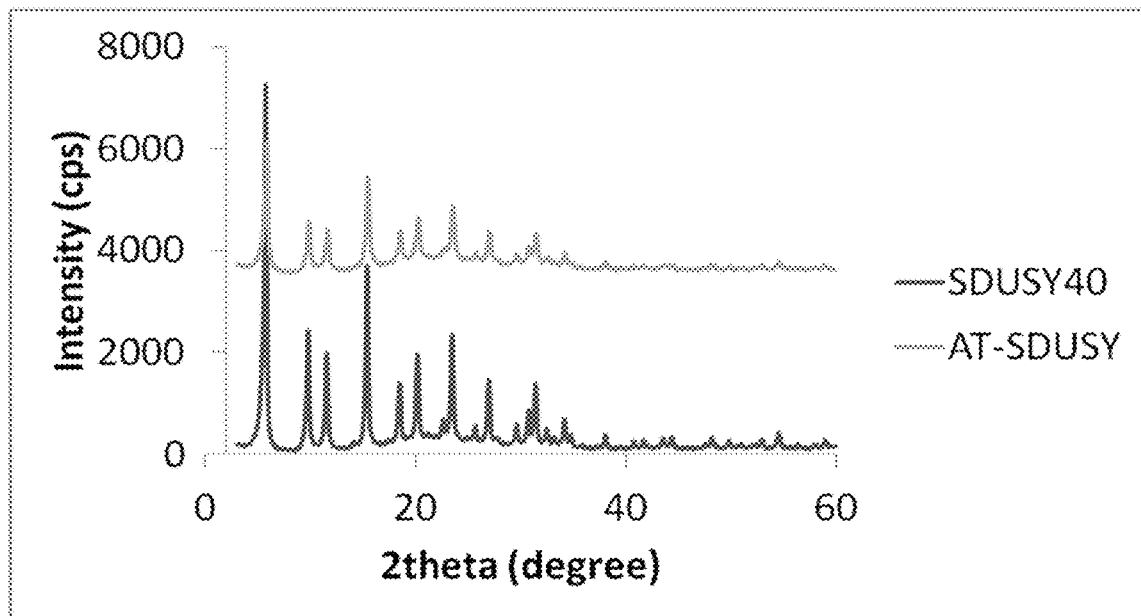
FIG. 2 is an overlay of X-ray diffraction (XRD) patterns of unmodified zeolite (SDUSY40) and alkaline-treated zeolite (AT-SDUSY).

The XRD patterns (FIG. 2) show the comparative structural stability of the AT-SDUSY zeolite and the SDUSY materials and displayed highly pure crystalline FAU structure of the material [D. Verboekend, T. C. Keller, S. Mitchell, J. Pérez-Ramírez, Hierarchical FAU- and LTA-Type Zeolites by Post-Synthetic Design: A New Generation of Highly Efficient Base Catalysts, Adv. Funct. Mater. 23 (2013) 1923-1934, incorporated herein by reference in its entirety]. The SEM images (FIGS. 3A-B) show the presence of an octahedral morphology only in AT-SDUSY, which is characteristic of its faujasite crystals containing large mesopores [J. A. H., K. A. J., de J. K. P., On the Shape of the Mesopores in Zeolite Y: A Three-Dimensional Transmission Electron Microscopy Study Combined with Texture Analysis, J. Phys. Chem. B. 106 (2002) 11905-11909, incorporated herein by reference in its entirety]. Further, except for crystal size reduction, no significant changes (e.g., clear signs of cracks, rugged surfaces, and globular particles) were noticed upon modification.

Table 1 summarizes the comparative structural and textural data of the zeolite sorbent materials. The AT-SDUSY sorbent material showed an improved external surface area and larger pore sizes that contributed to its more effective adsorption properties compared to SDUSY40. The Si/Al ratio reduction showed the preferential leaching of silicon from the solid that gave rise to the mesopores in the zeolite crystal upon the alkaline treatment [D. Verboekend, J. Pérez-Ramírez, Desilication Mechanism Revisited: Highly Mesoporous All-Silica Zeolites Enabled Through Pore-Directing Agents, Chem.—A Eur. J. 17 (2011) 1137-1147, incorporated herein by reference in its entirety]. This amounts to the fact that the alkaline modification increased the surface area and preserved intrinsic properties of the zeolite material. These improved features, upon modification, were responsible at least in part for the enhanced adsorption performance of the AT-SDUSY material in removing heavy metal from spiked water.

TABLE 1

Textural parameters obtained for the developed sorbent materials

| Material | Si/Al | $S_{BET}$ ($m^2g^{-1}$) | $S_{micro}$ ($m^2g^{-1}$) | $S_{meso}$ ($m^2g^{-1}$) | $V_{total}$ ($cm^3g^{-1}$) | $V_{micro}$ ($cm^3g^{-1}$) | APD (nm) |
|---|---|---|---|---|---|---|---|
| SDUSY40 | 32 | 607 | 424 | 183 | 0.51 | 0.23 | 11, 21 |
| AT-SDUSY | 17 | 720 | 357 | 362 | 1.00 | 0.19 | 15, 31 |

Example 10

Investigation of Sorption Parameters

The cations ($Na^+$, $H^+$, etc.) present within the zeolite framework to balance the net charges of $Al^{3+}$ and $Si^{4+}$, are only representative and can be exchanged with other cations such as $Pb^{2+}$, $Cd^{2+}$, $Cu^{2+}$, $Cr^{3+}$, etc., Thus, zeolite-based materials are suitable for the removal of heavy metal ions in water treatment. Notably, several parameters can influence the exchange process of ion sorption from water. Examples of such parameters investigated for heavy metal ions removal in the present disclosure included (i) temperature and pH of the spiked water, (ii) initial concentration of metal ions in the solution, (iii) sorbent mass, and (iv) sorbent (zeolite) Si/Al ratio.

Example 11

Effect of Si/Al Ratio on the Lead Ion Removal

Figure 4:
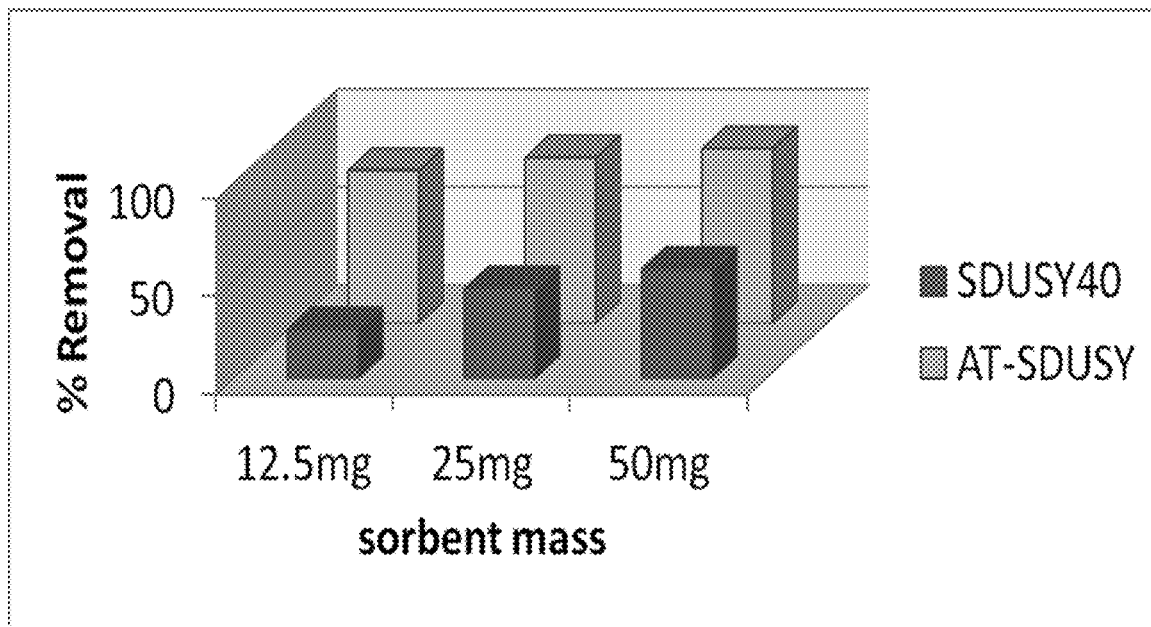
FIG. 4 is a graph showing the effects of molar ratio of Si to Al and mass of zeolite on Pb$^{2+}$ removal efficiency of a sorbent device (pH of aqueous solution=6, initial concentration of Pb$^{2+}$=10 mg/L, contacting time=20 min, volume of aqueous solution=25 mL, T=298 K).

As shown in Table 1 and FIG. 4, sorption efficiency of the zeolite materials, as a reflection of the cation exchange capacity (CEC) of the zeolite, increased as Si/Al ratio at the same mass decreased. This is because an increase in Si/Al ratio of zeolite has led to a decrease in the framework charge, and a decrease in the numbers of cations that can be exchanged, indicating a drop in the CEC. The unmodified SDUSY40 had a higher Si/Al ratio and a lower sorption of metal ions than AT-SDUSY in cation exchange process. This indicates that the alkaline modification improves the sorption capacity of such silica-rich zeolite.

Example 12

Sorbent Mass and Modification Effect on Sorption Performance

The sorbent mass (dosage) has significant effect on the adsorption efficiency, depending on the initial adsorbate concentration. At initial concentration of 10 mg/L $Pb^{2+}$ (20 min contact time, 20 mL of the spiked water at pH of 6), an increase in the removal percentages was observed with an increase in the mass of unmodified zeolite (SDUSY40) (FIG. 4). This could be resulted from the increasing surface area because of the greater mass of the porous sorbent materials. Similarly, removal percentage increased from 24.98% to 55.84% as the mass increased from 12.5 mg to 50 mg.

Using the same amount of the sorbent, alkaline treated zeolite (AT-SDUSY) showed significant improvement in the percentage removal of the $Pb^{2+}$ ions compared to untreated SDUSY40. At a mass of 12.5 mg, about 212 times increase in percentage removal was observed by going from SDUSY40 to AT-SDUSY ((AT-SDUSY (78.06%), SDUSY40 (24.98%), see FIG. 4). However, it was also observed that further increase in the mass of AT-SDUSY resulted in relatively small increase in removal personage. This is probably because the available ions could be effectively adsorbed by a small dosage of modified zeolite and further increase in mass only captured the remaining ions. This observation suggests the potential of the AT-SDUSY as an alternative material for effective adsorption and enrichment of the trace amount of the lead metal ions.

Example 13

Effect of Sample pH on Extraction

The affinity of sorbent for selective sorption of certain metal ions relates to the functional group present in the sorbent. As shown by the FTIR, both SDUSY40 and AT-SDUSY had hydroxy functional group contributing to the sorption of heavy metal ions. The pH of the solution significantly influences the adsorption of the metal ion on the surface of the adsorption material. This is because (i) at low pH, competition exists between the hydrogen ions and target metal ions to be adsorbed on the material surface, and (ii) at high pH, sparingly soluble hydroxide precipitate of metal ions is likely formed.

Figure 5:
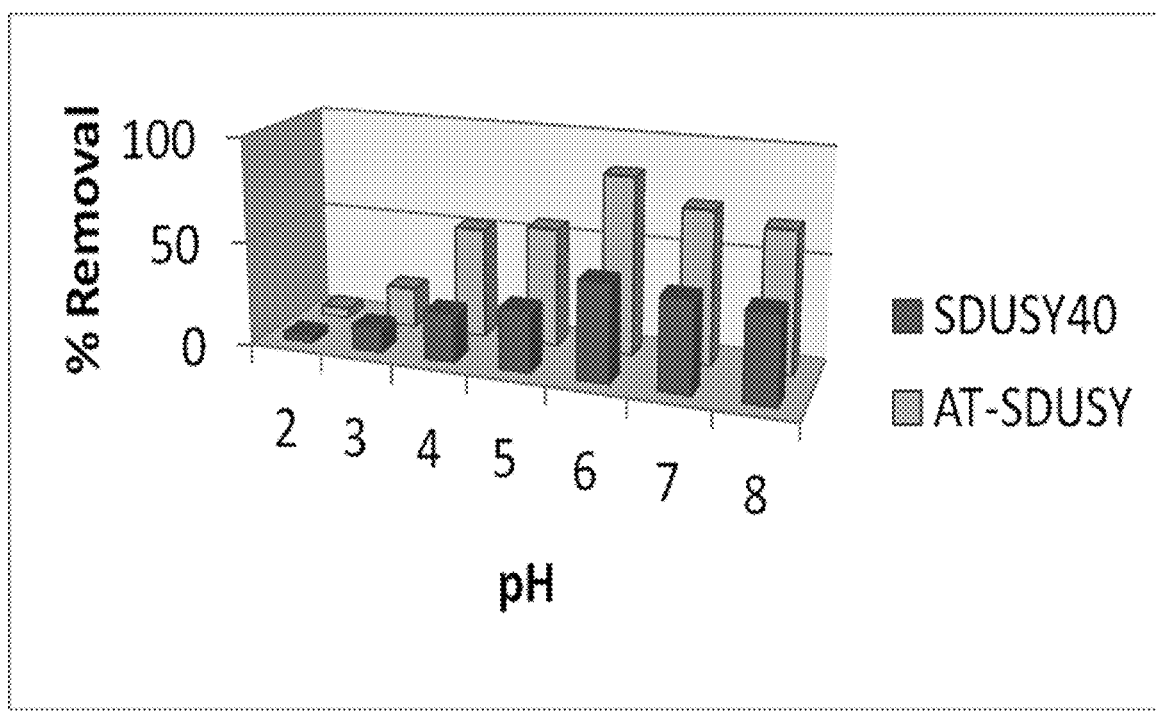
FIG. 5 is a graph showing the effect of pH of aqueous solution on Pb$^{2+}$ removal efficiency of a sorbent device (mass of zeolite=25 mg, initial concentration of Pb$^{2+}$ ions=10 mg/L, contact time=20 min, volume of aqueous solution=25 mL, T=298 K).

Therefore, the sorption capacity of studied metal ions was measured in the sample pH range of 2-8 (triplicate) for both SDUSY40 and AT-SDUSY zeolite materials. Although they were at different quantitative levels, both zeolite materials adsorbed the greatest amount of lead metal ions at pH=6 (FIG. 5). At pH>7, a decrease in metal ions removal was observed, which could be ascribed to the precipitation of M (OH), capable of contaminating the sorbent surface. In addition, the low sorption capacities at low pH indicate that the adsorbed metal ions can be recovered using acidic medium (see Example 15).

Figure 6:
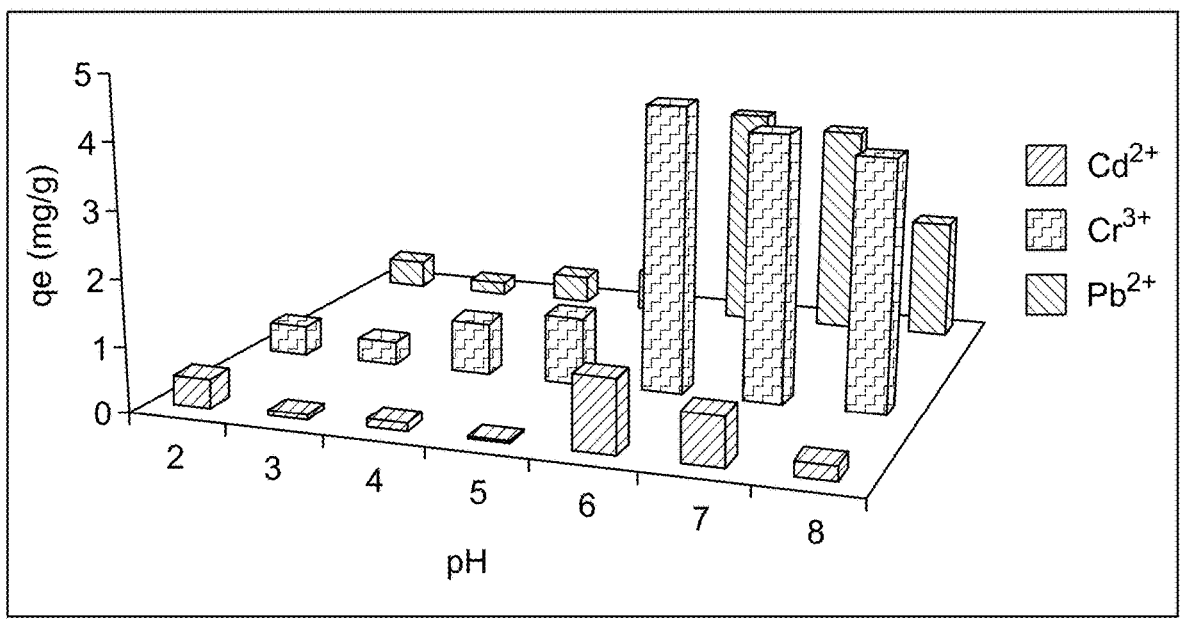
FIG. 6 is a graph showing the effect of pH of aqueous solution on Cd$^{2+}$, Cr$^{3+}$, and Pb$^{2+}$ adsorption capacities, respectively of a sorbent device having alkaline-treated zeolite (AT-SDUSY) (mass of zeolite=25 mg, initial concentration of heavy metal ions=10 mg/L, contact time=20 min, volume of aqueous solution=25 mL, T=298 K).

In the subsequent stages, only AT-SDUSY sorbent sample was further investigated for adsorbing other heavy metal ions. Remarkably, at pH of 6, the AT-SDUSY sorbent exhibited higher sorption capacity for $Pb^{2+}$ and other heavy metal ions ($Cr^{3+}$ and $Cd^{2+}$) than at other pH levels (see FIG. 6).

Zeolites have different ion exchange preference for different ions in aqueous samples. The preference for such particular ions depends on field strength of the zeolite pore. Usually, the higher charged cations (e.g., heavy metals such as $Cr^{3+}$) have a greater tendency to be attracted toward a site of opposite charge than others cations with less charges such as $Cd^{2+}$, $Pb^{2+}$, etc. [M. H. Jnr, A. I. Spiff, Effect of metal ion concentration on the biosorption of Pb2+ and Cd2+ by *Caladium bicolor* (wild cocoyam), African J. Biotechnol. 4 (2005) 191-196, incorporated herein by reference in its entirety]. The experimental results of the present disclosure revealed the following adsorption order: $Cr^{3+}>Pb^{2+}>Cd^{2+}$.

Example 14

Effects of Contact Time, Initial Concentration, and Temperature

Figure 7A:
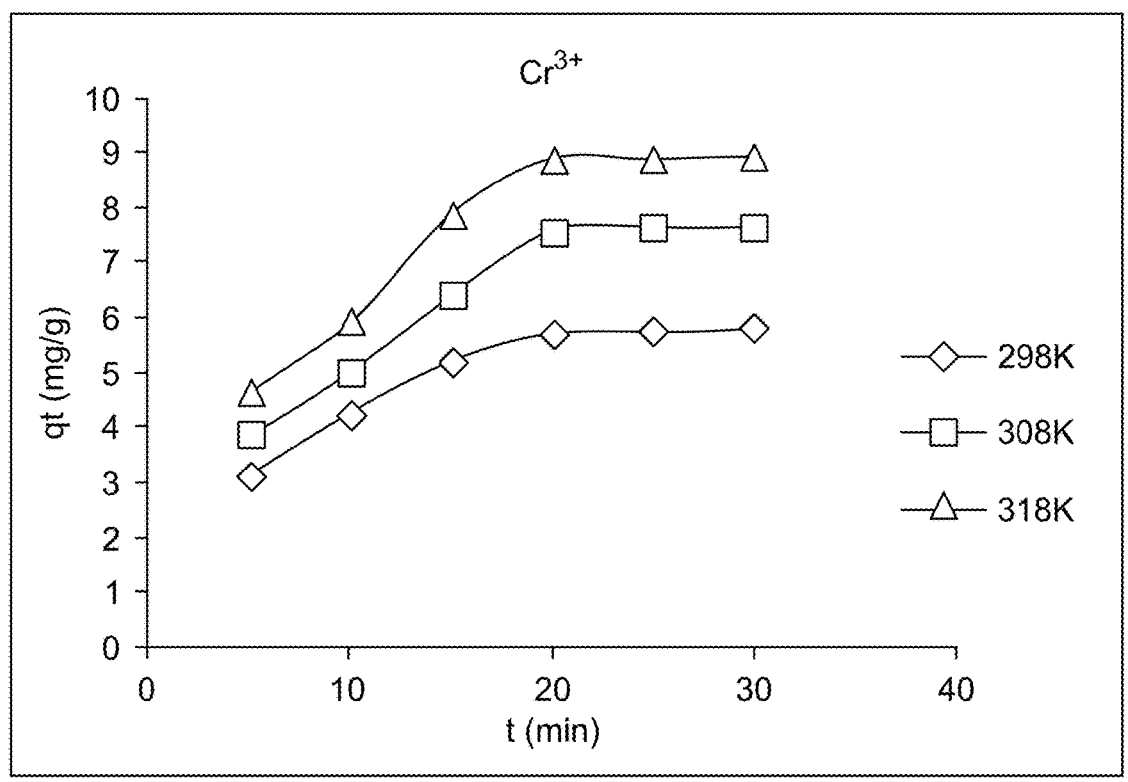
FIG. 7A is a graph showing the effects of contacting time and temperature on Cr$^{3+}$ adsorption capacity of a sorbent device having alkaline-treated zeolite (AT-SDUSY) (mass of zeolite=25 mg, initial concentration of Cr$^{3+}$=10 mg/L, pH of aqueous solution=6, volume of aqueous solution=25 mL).
Figure 7B:
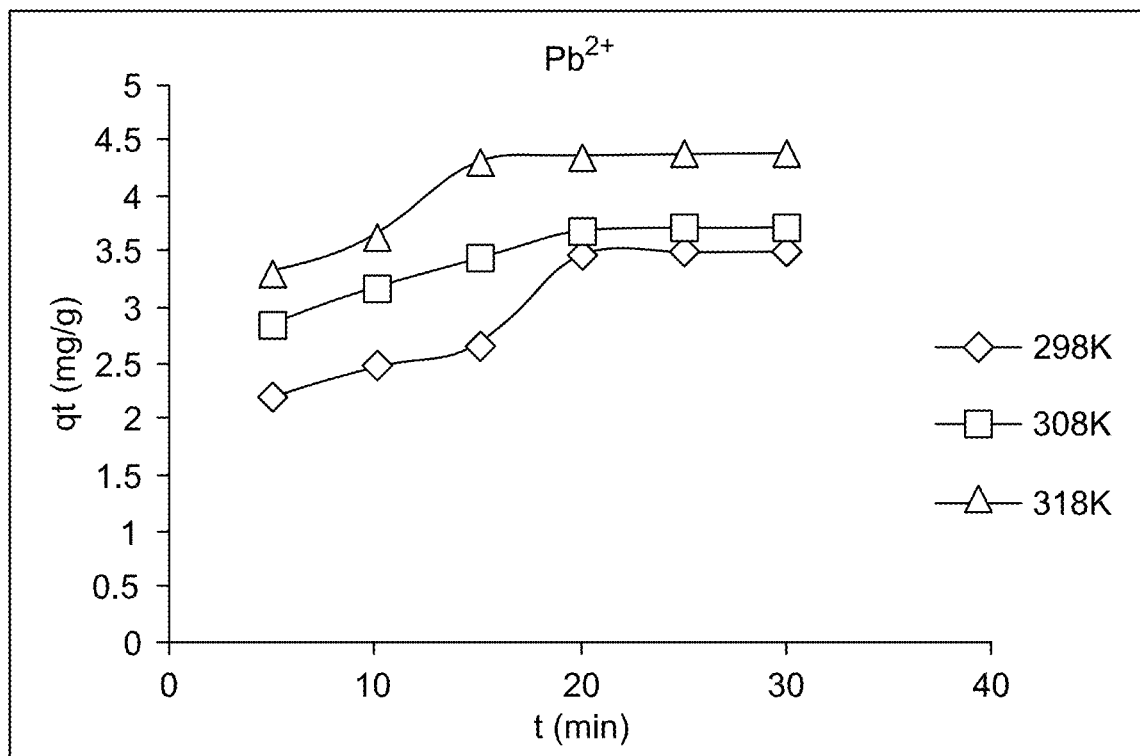
FIG. 7B is a graph showing the effects of contacting time and temperature on Pb$^{2+}$ adsorption capacity of a sorbent device having alkaline-treated zeolite (AT-SDUSY) (mass of zeolite=25 mg, initial concentration of Pb$^{2+}$=10 mg/L, pH of aqueous solution=6, volume of aqueous solution=25 mL).
Figure 7C:
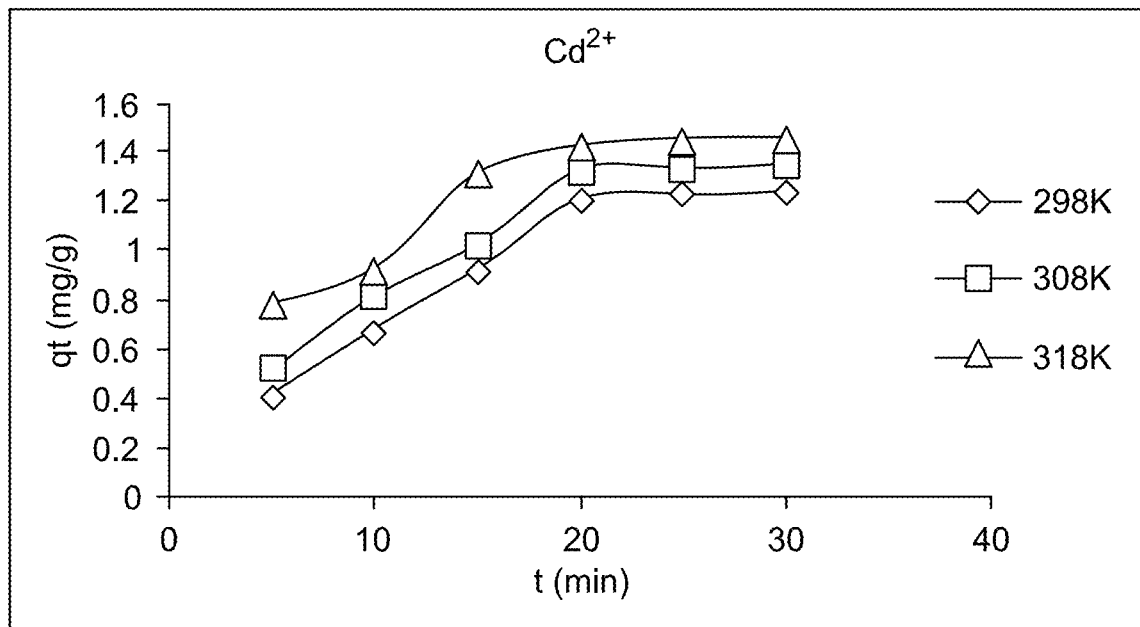
FIG. 7C is a graph showing the effects of contacting time and temperature on Cd$^{2+}$ adsorption capacity of a sorbent device having alkaline-treated zeolite (AT-SDUSY) (mass of zeolite=25 mg, initial concentration of Cd$^{2+}$=10 mg/L, pH of aqueous solution=6, volume of aqueous solution=25 mL).

FIGS. 7A-C show the sorption capacities of AT-SDUSY towards different ions as a function of time. A quite rapid adsorption within the first few minutes of contact time was observed up to 20 min. Beyond 20 min, the changes became insignificant, probably because the surface area of the sorbent became saturated and the adsorption process was hindered. A similar trend was observed for the sorption at different temperatures with an equilibrium contact time of 20 min, which was adopted subsequently in the present disclosure.

Figure 11A:
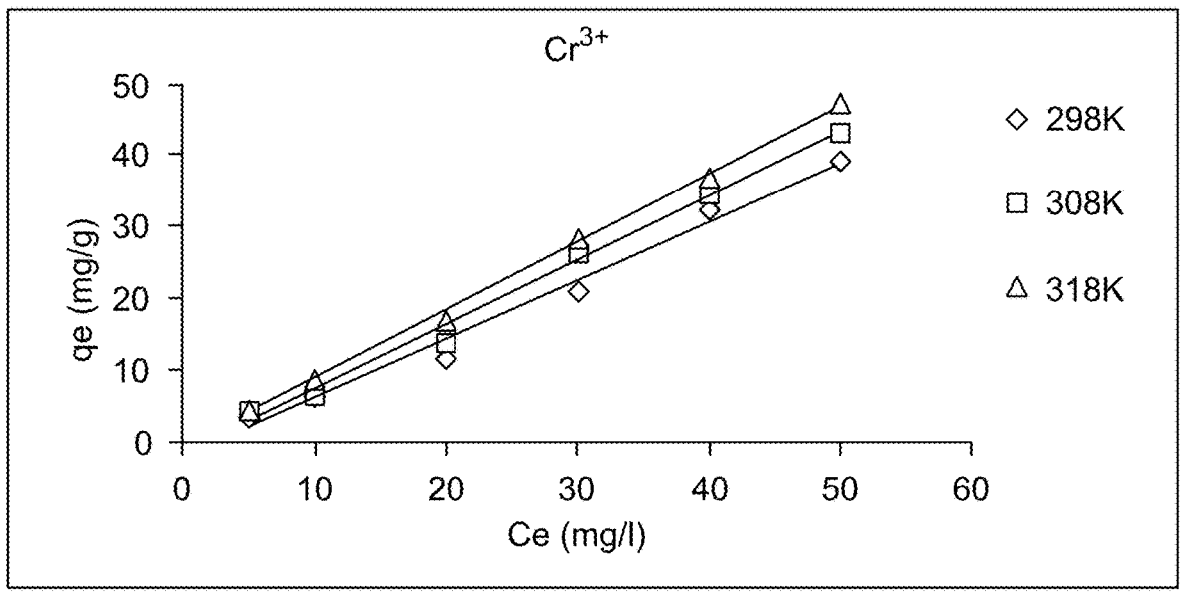
FIG. 11A is a graph showing the effects of initial concentration of $Cr^{3+}$ and temperature on $Cr^{3+}$ adsorption capacity of a sorbent device having alkaline-treated zeolite (AT-SDUSY) (mass of zeolite=25 mg, contacting time=20 min, pH of aqueous solution=6, volume of aqueous solution=25 mL).
Figure 11B:
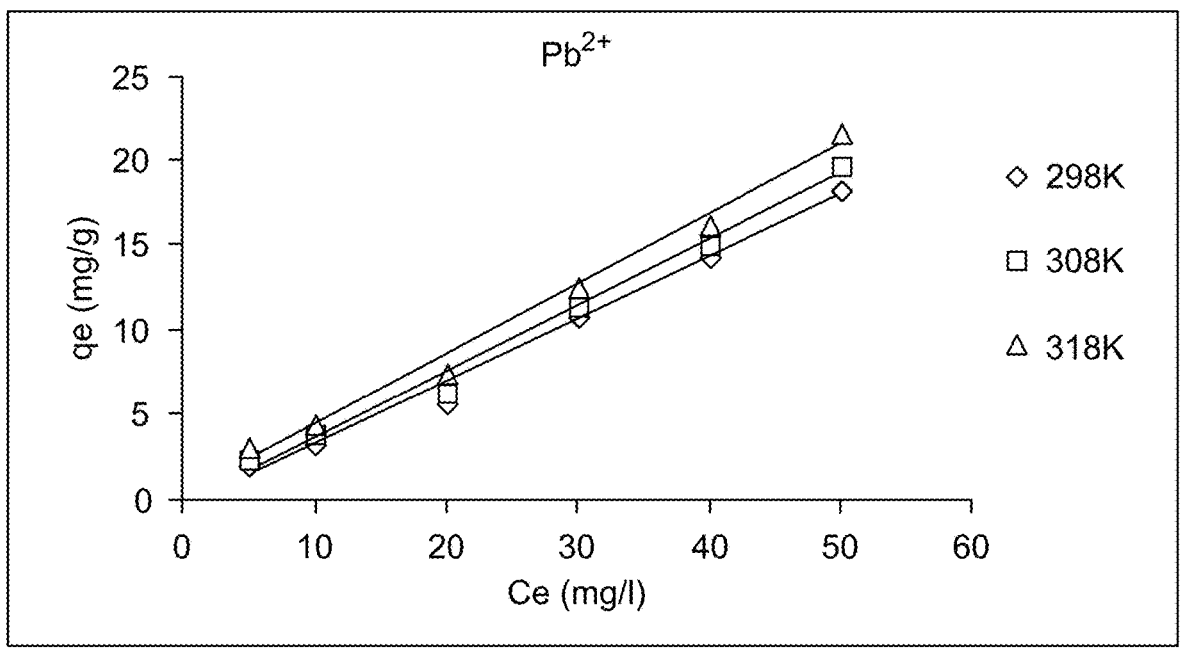
FIG. 11B is a graph showing the effects of initial concentration of $Pb^{2+}$ and temperature on $Pb^{2+}$ adsorption capacity of a sorbent device having alkaline-treated zeolite (AT-SDUSY) (mass of zeolite=25 mg, contacting time=20 min, pH of aqueous solution=6, volume of aqueous solution=25 mL).
Figure 11C:
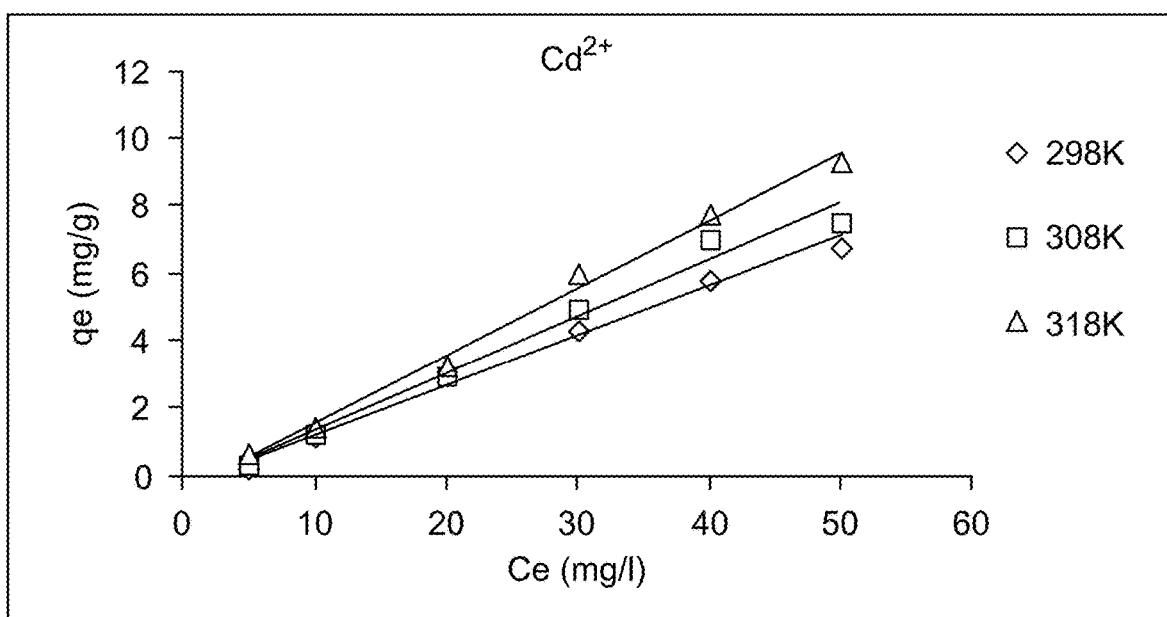
FIG. 11C is a graph showing the effects of initial concentration of $Cd^{2+}$ and temperature on $Cd^{2+}$ adsorption capacity of a sorbent device having alkaline-treated zeolite (AT-SDUSY) (mass of zeolite=25 mg, contacting time=20 min, pH of aqueous solution=6, volume of aqueous solution=25 mL).

FIGS. 11A-C show that the adsorption capacity increases with increasing initial concentration. This could be resulted from an increase in the quantity of metal ion adsorbed onto zeolite surface with the increasing concentration as the concentration gradient could be attributed as a driving force. In addition, temperature plays a role in the adsorption of the heavy metal ions onto the surface of the adsorbent. The observed enhancement in the sorption with increased temperature indicated the endothermic nature of the adsorption process (see FIGS. 7A-C and FIGS. 11A-C).

Example 15

Sorbent Regeneration

Regeneration of the adsorbent is not only necessary for its prolonged use in adsorptive removal of pollutants, but it also influences the cost of the process by reducing the required amount of the sorbent. In addition, using regenerated sorbent material is a sustainable and environment friendly approach. The reversibility of electrostatic field-, polarizability- and molecular sieve-based adsorption studies enables the reusability of zeolite and indicates that zeolites can be used as a cost-effective adsorption media.

Figure 8:
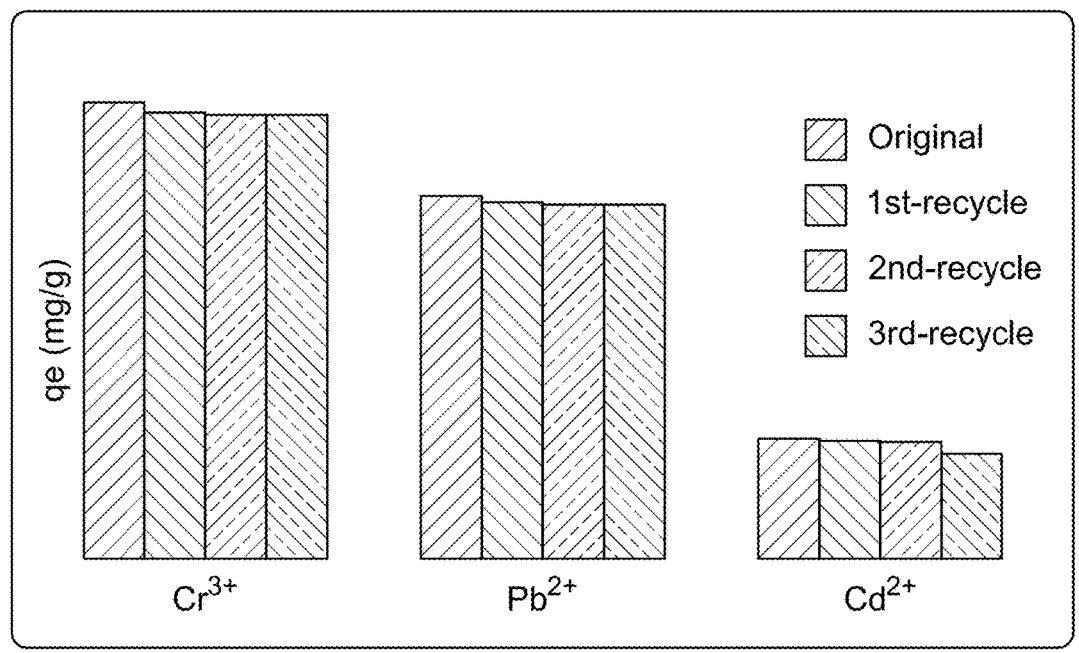
FIG. 8 is a graph summarizing adsorption capacities of heavy metal ions of a sorbent device having alkaline-treated zeolite (AT-SDUSY) (original), and regenerated sorbent devices having alkaline-treated zeolite (AT-SDUSY) that are recycled once (1$^{st}$-recycle), twice (2$^{nd}$-recycle), and three times (3$^{rd}$-recycle), respectively.

The choice of the instrument for analysis of the metal ions eliminated the use of organic solvent for desorption. The pH effect test on the adsorption demonstrated better recovery of the adsorbed metal ions was seen in acidic medium. The hydroxy groups in the zeolite can be protonated in acidic medium such that the attraction to positively charged metal ions became smaller, thus favoring the release of metal ions into a recovery solution. Specifically, 2 mL of 1M $HNO_3$ was used to adequately soak the sorbent device after initial sorption. Then, 5 min of ultra-sonication of the sorbent device led to almost complete recovery of the sorbent device for reuse. The recyclability was confirmed by the insignificant changes in the metal ions sorption performance of the sorbent device after three cycles of re-use (see FIG. 8).

Example 16

Adsorption Kinetic Studies

The integrity of the linear plots of the studied kinetic models can be estimated using the obtained coefficient of determination, a referred criterion in the determining the adequacy of a kinetic model [Y. S. Ho, G. Mckay, The kinetics of sorption of basic dyes from aqueous solution by sphagnum moss peat, Can. J. Chem. Eng. 76 (1998) 822-827; and K. V. Kumar, V. Ramamurthi, S. Sivanesan, Modeling the mechanism involved during the sorption of methylene blue onto fly ash, J. Colloid Interface Sci. 284 (2005) 14-21, each incorporated herein by reference in their entirety]. In order to ascertain the mechanism of the adsorption, three models were explored in the present disclosure.

Example 17

Lagergren Pseudo First-Order Kinetics

The Lagergren pseudo first order expression is given as:

$$\log(q_e - q_t) = \log q_e - \left(\frac{K_1}{2.303}\right)t \quad (3)$$

where K1 is the rate constant (min$^{-1}$), $q_e$ is the amount of adsorbed at equilibrium (mg/g), $q_t$ is the amount adsorbed at time t (mg/g), and h is the initial sorption rate (mg/g·min).

Figure 12A:
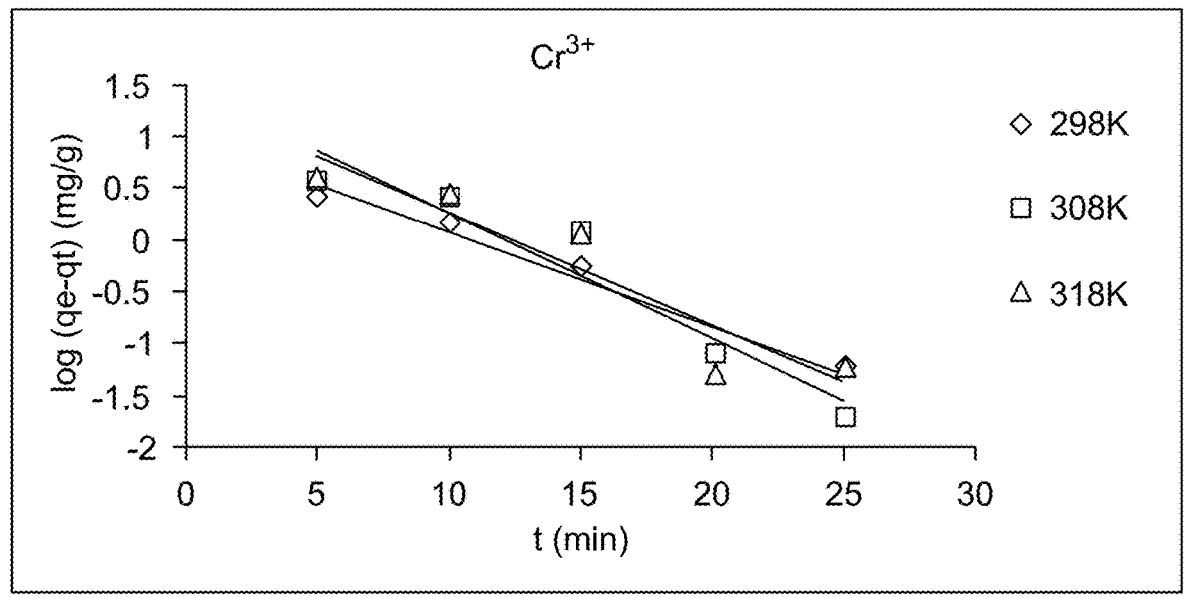
FIG. 12A is an overlay of pseudo first order plots illustrating the $Cr^{3+}$ adsorption kinetics of a sorbent device having alkaline-treated zeolite (AT-SDUSY) at 298K, 308K, and 318K, respectively.
Figure 12B:
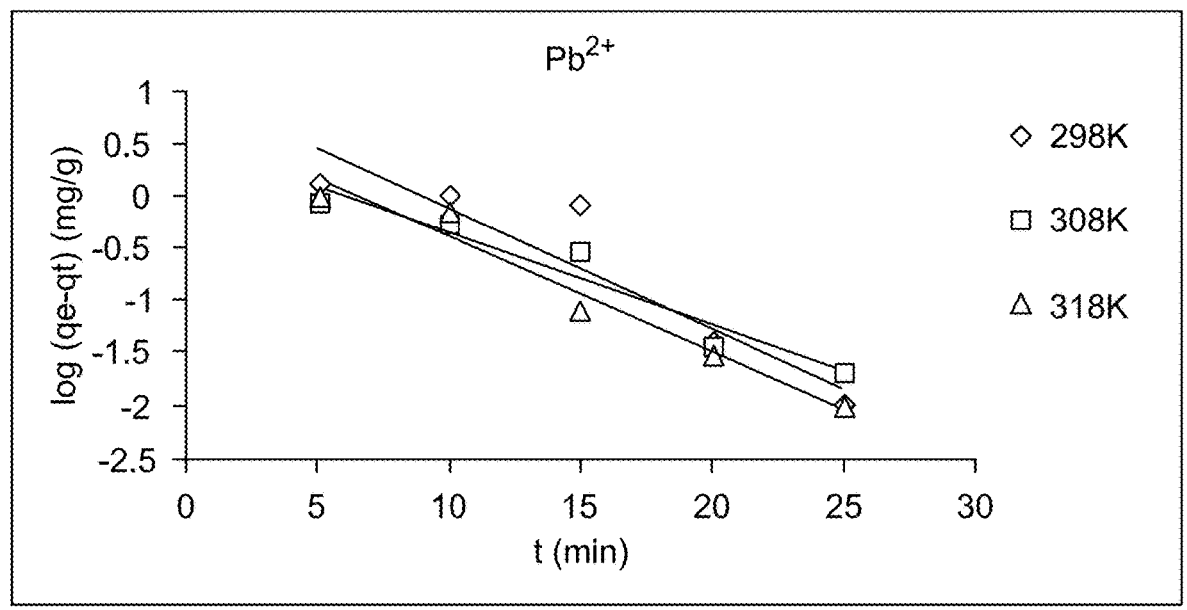
FIG. 12B is an overlay of pseudo first order plots illustrating the $Pb^{2+}$ adsorption kinetics of a sorbent device having alkaline-treated zeolite (AT-SDUSY) at 298K, 308K, and 318K, respectively.
Figure 12C:
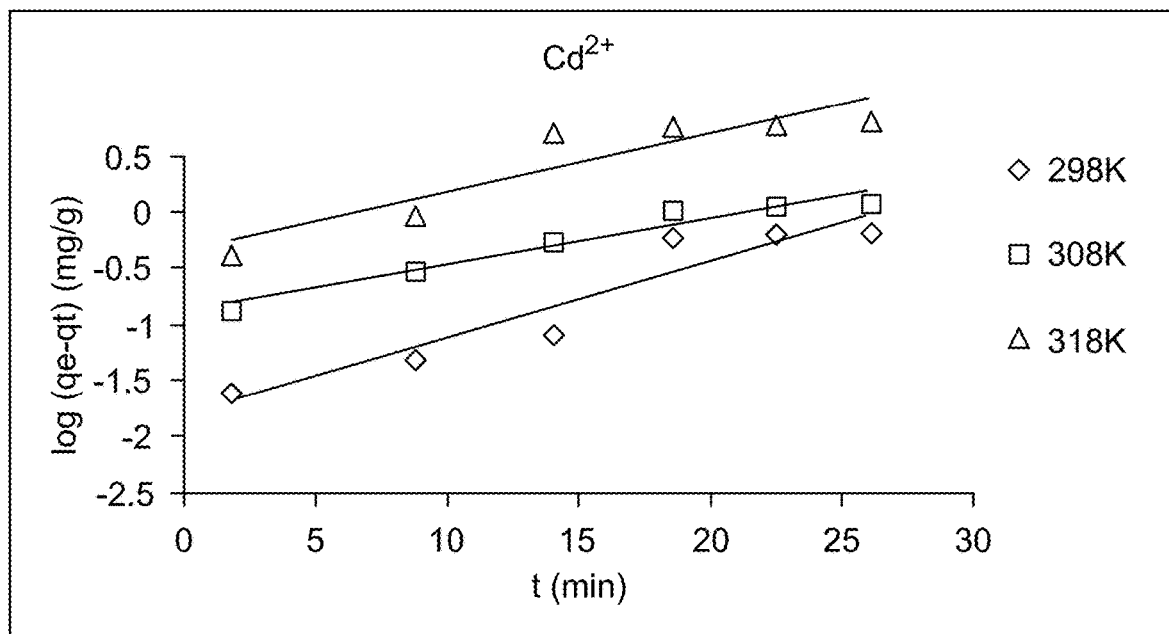
FIG. 12C is an overlay of pseudo first order plots illustrating the $Cd^{2+}$ adsorption kinetics of a sorbent device having alkaline-treated zeolite (AT-SDUSY) at 298K, 308K, and 318K, respectively.

The parameters obtained from the plot of Eq. (3) are summarily presented in the section of Table 2. The discrepancies between the experimental and calculated $q_e$ are large with relatively low $R^2$ values (≤0.96) for different metal ions at different temperature, showing that the data did not fit into this kinetic model (FIGS. 12A-C).

Example 18

Pseudo Second-Order Kinetics

Unlike pseudo first-order, the pseudo second-order kinetics was found to show a better fit towards the sorption of studied heavy metals for the entire sorption period. Its mathematical expression can be written as:

$$\frac{t}{q_t} = \frac{1}{h} + \frac{t}{q_g} \quad (4)$$

$$h = K_2 q_e^2 \quad (5)$$

where $K_2$ is the rate constant (g/mg·min), $q_e$ is the amount of adsorbed at equilibrium (mg/g), $q_t$ is the amount adsorbed at time t (mg/g), h is the initial sorption rate (mg/g·min).

The slight differences between the experimental and calculated $q_e$ can be ascribed to experimental error. The largest $R^2$ values were obtained for different metal ions at different temperatures. It can be said that the pseudo second-order sorption mechanism predominated and that the overall sorption rate appeared to be controlled by a chemisorptions mechanism through the covalent bond between the adsorbate and adsorbent surface [Y. Ho, G. Mckay, Pseudo-second order model for sorption processes, Process Biochem. 34 (1999) 451-465; and Y. Ho, G. Mckay, The sorption of lead (II) ions on peat, Water Res. 33 (1999) 578-584, each incorporated herein by reference in their entirety].

TABLE 2

Kinetic parameters obtained for $Cr^{3+}$, $Pb^{2+}$, and $Cd^{2+}$ ions adsorption on AT-SDUSY at 298K, 308K, and 318K

| | | Pseudo-first order kinetics | | | | Pseudo-second order kinetics | | | | Intraparticle diffusion Model | | |
|---|---|---|---|---|---|---|---|---|---|---|---|---|
| Ions | T(K) | $q_e$, exp (mg/g) | $K_1(10^1)$ (min$^{-1}$) | $q_e$, cal (mg/g) | $R^2$ | $K_2(10^2)$ (g/mg·min) | $q_e$, cal (mg/g) | h (mg/g·min) | $R^2$ | $K_{id}$ (mg/mg·min$^{1/2}$) | C (mg/g) | $R^2$ |
| $Cr^{3+}$ | 289 | 5.81 | 2.11 | 9.77 | 0.95 | 2.26 | 7.16 | 1.16 | 0.99 | 0.86 | 1.52 | 0.90 |
| | 308 | 7.64 | 2.80 | 30.19 | 0.91 | 1.15 | 10.10 | 1.17 | 0.98 | 1.28 | 1.18 | 0.93 |
| | 318 | 8.93 | 2.53 | 23.40 | 0.88 | 1.11 | 11.56 | 1.49 | 0.98 | 1.45 | 1.67 | 0.91 |
| $Pb^{2+}$ | 289 | 3.5 | 2.65 | 10.71 | 0.85 | 3.76 | 4.26 | 0.68 | 0.97 | 0.46 | 1.11 | 0.90 |
| | 308 | 3.73 | 2.03 | 3.39 | 0.94 | 10.70 | 4.03 | 1.74 | 1.00 | 0.28 | 2.30 | 0.94 |
| | 318 | 4.39 | 2.51 | 4.94 | 0.96 | 9.11 | 4.78 | 2.08 | 1.00 | 0.36 | 2.63 | 0.84 |
| $Cd^{2+}$ | 289 | 1.24 | 2.35 | 4.60 | 0.92 | 2.01 | 2.27 | 0.10 | 0.93 | 0.24 | 0.00 | 0.92 |
| | 308 | 1.34 | 2.29 | 4.13 | 0.90 | 3.18 | 2.10 | 0.14 | 0.97 | 0.26 | 0.00 | 0.94 |
| | 318 | 1.46 | 2.27 | 3.31 | 0.96 | 6.66 | 1.90 | 0.24 | 0.97 | 0.30 | 0.00 | 0.82 |

TABLE 3

Isotherm parameters obtained for $Cr^{3+}$, $Pb^{2+}$, and $Cd^{2+}$ ions adsorption on AT-SDUSY at 298K, 308K, and 318K

| | | Langmuir isotherm parameters | | | | Freundlich isotherm parameters | | | | Temkin isotherm parameters | | |
|---|---|---|---|---|---|---|---|---|---|---|---|---|
| Ions | T(K) | $Q_o$, (mg/g) | b ($10^2$) (L/mg) | $R^2$ | $R_L$ | $K_F$ ($10^2$) (mg/g) | 1/n, (mg/g) | n | $R^2$ | $K_T$ ($10^2$) (L/g) | $b_T$ (KJ/mol) | $R^2$ |
| $Cr^{3+}$ | 289 | 109.9 | 7.22 | 0.98 | 0.73 | 67.07 | 1.02 | 0.98 | 0.98 | 67.66 | 2.42 | 0.98 |
| | 308 | 200.0 | 4.24 | 0.98 | 0.83 | 71.86 | 1.04 | 0.97 | 0.99 | 72.78 | 2.46 | 0.99 |
| | 318 | 434.8 | 2.18 | 0.99 | 0.90 | 89.19 | 1.01 | 0.99 | 1.00 | 89.28 | 2.62 | 1.00 |
| $Pb^{2+}$ | 289 | 70.53 | 1.42 | 0.97 | 0.58 | 43.21 | 0.94 | 1.07 | 0.98 | 40.79 | 2.65 | 0.98 |
| | 308 | 75.79 | 1.32 | 0.97 | 0.60 | 45.76 | 0.94 | 1.06 | 0.98 | 43.50 | 2.73 | 0.98 |
| | 318 | 84.68 | 2.24 | 0.95 | 0.47 | 67.83 | 0.86 | 1.16 | 0.98 | 63.66 | 3.08 | 0.98 |
| $Cd^{2+}$ | 289 | 200 | 0.03 | 0.85 | 0.98 | 3.28 | 1.42 | 0.70 | 0.96 | 9.03 | 1.74 | 0.96 |
| | 308 | 333 | 0.03 | 0.93 | 0.99 | 6.11 | 1.27 | 0.78 | 0.98 | 11.15 | 2.01 | 0.99 |
| | 318 | 500 | 0.03 | 0.99 | 0.98 | 9.51 | 1.19 | 0.84 | 1.00 | 13.83 | 2.22 | 1.00 |

Figure 9A:
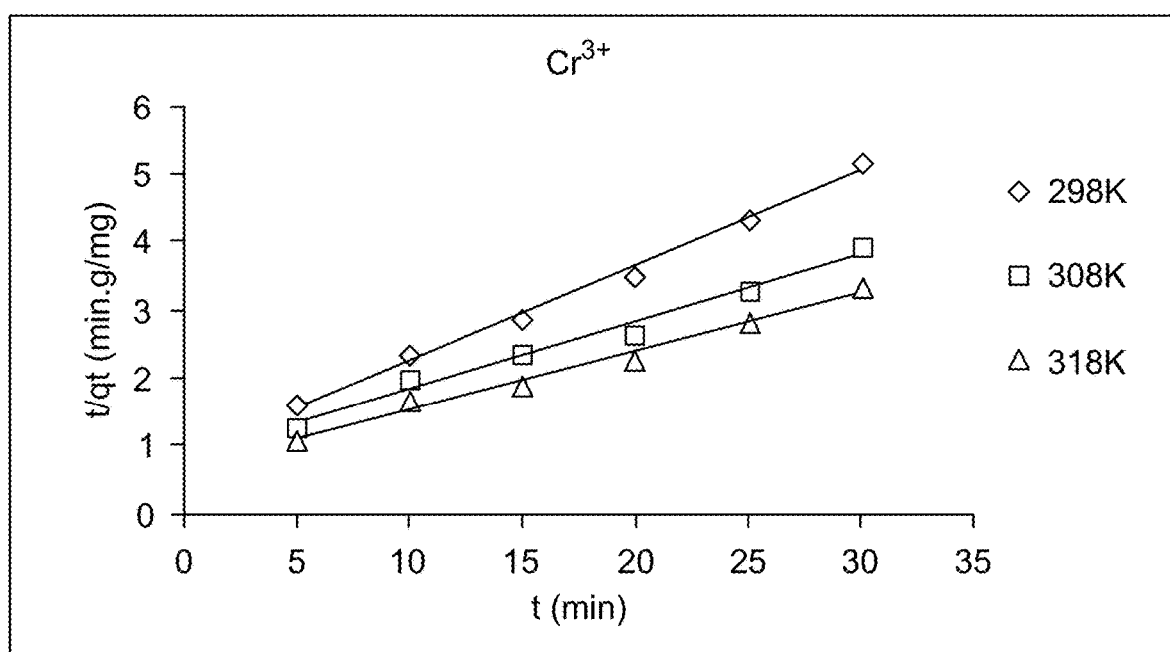
FIG. 9A is an overlay of pseudo second order plots illustrating the Cr$^{3+}$ adsorption kinetics of a sorbent device having alkaline-treated zeolite (AT-SDUSY) at 298K, 308K, and 318K, respectively.
Figure 9B:
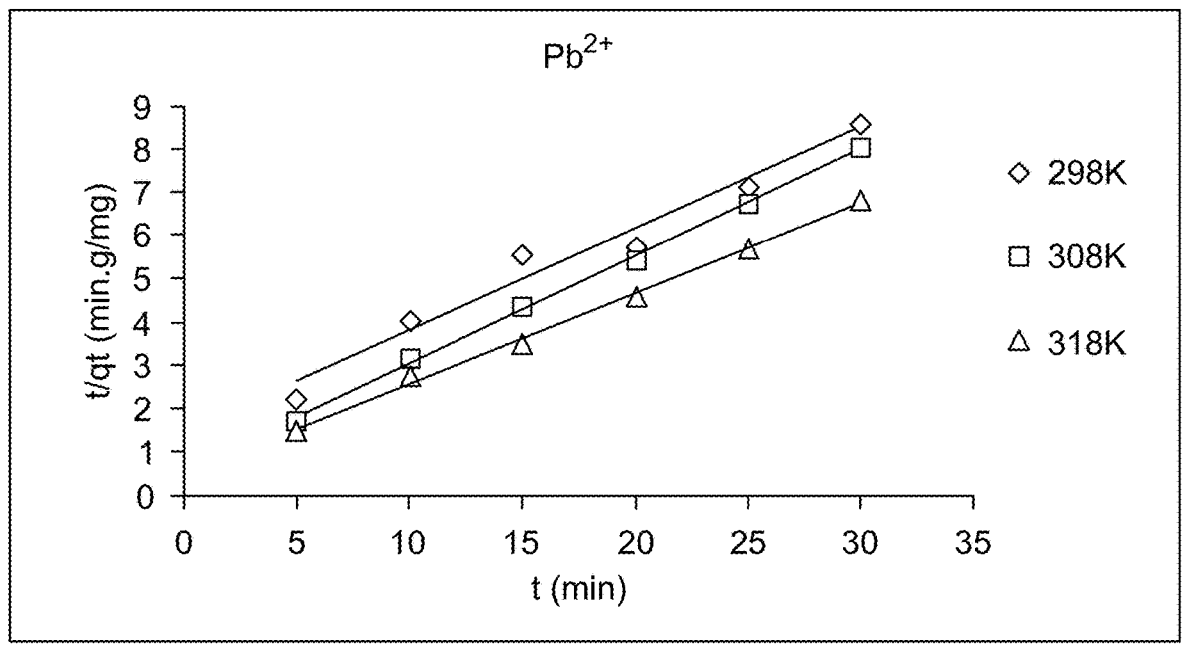
FIG. 9B is an overlay of pseudo second order plots illustrating the Pb$^{2+}$ adsorption kinetics of a sorbent device having alkaline-treated zeolite (AT-SDUSY) at 298K, 308K, and 318K, respectively.
Figure 9C:
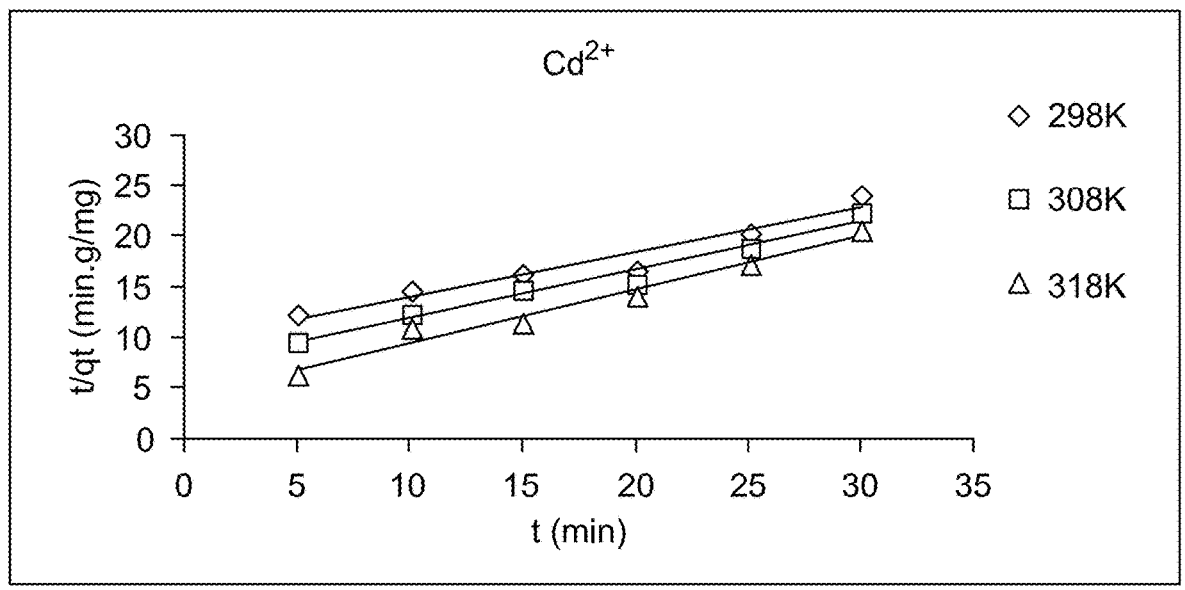
FIG. 9C is an overlay of pseudo second order plots illustrating the Cd$^{2+}$ adsorption kinetics of a sorbent device having alkaline-treated zeolite (AT-SDUSY) at 298K, 308K, and 318K, respectively.

Although the dependence of the rate constant on the temperature could be ascertained, yet the h (initial sorption rate) values were found to increase with temperature for the three studied metal ions (see FIGS. 9A-C and Table 2). It is also noteworthy that the sorption of $Pb^{2+}$ was surprisingly enhanced more than $Cr^{3+}$ at higher temperatures (308 K and 318 K). This was probably due to better accommodation of the larger $Pb^{2+}$ (120 ppm) into the cavities of AT-SDUSY with more grip than the smaller size but highly charged $Cr^{3+}$. However, at the room temperature the trend ($Cr^{3+}$>$Pb^{2+}$>$Cd^{2+}$) was observed in terms of h-values.

Example 19

Intra-Particle Diffusion Kinetic Model

Figure 13A:
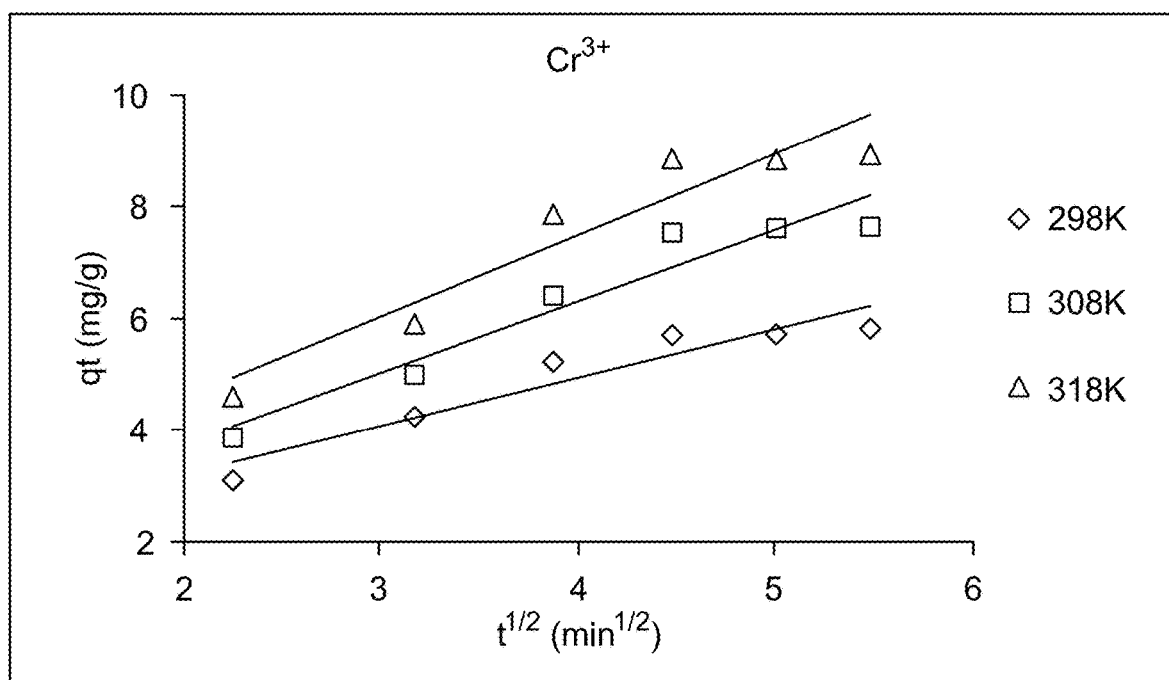
FIG. 13A is an overlay of intra-particle diffusion model plots illustrating the $Cr^{3+}$ adsorption kinetics of a sorbent device having alkaline-treated zeolite (AT-SDUSY) at 298K, 308K, and 318K, respectively.
Figure 13B:
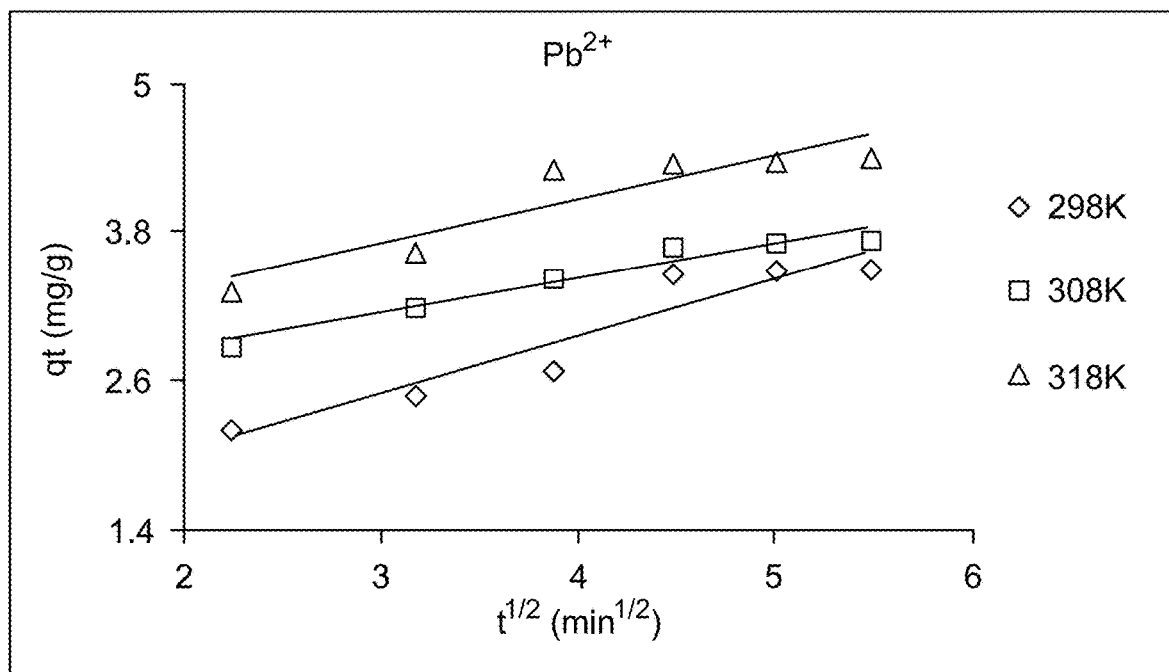
FIG. 13B is an overlay of intra-particle diffusion model plots illustrating the $Pb^{2+}$ adsorption kinetics of a sorbent device having alkaline-treated zeolite (AT-SDUSY) at 298K, 308K, and 318K, respectively.
Figure 13C:
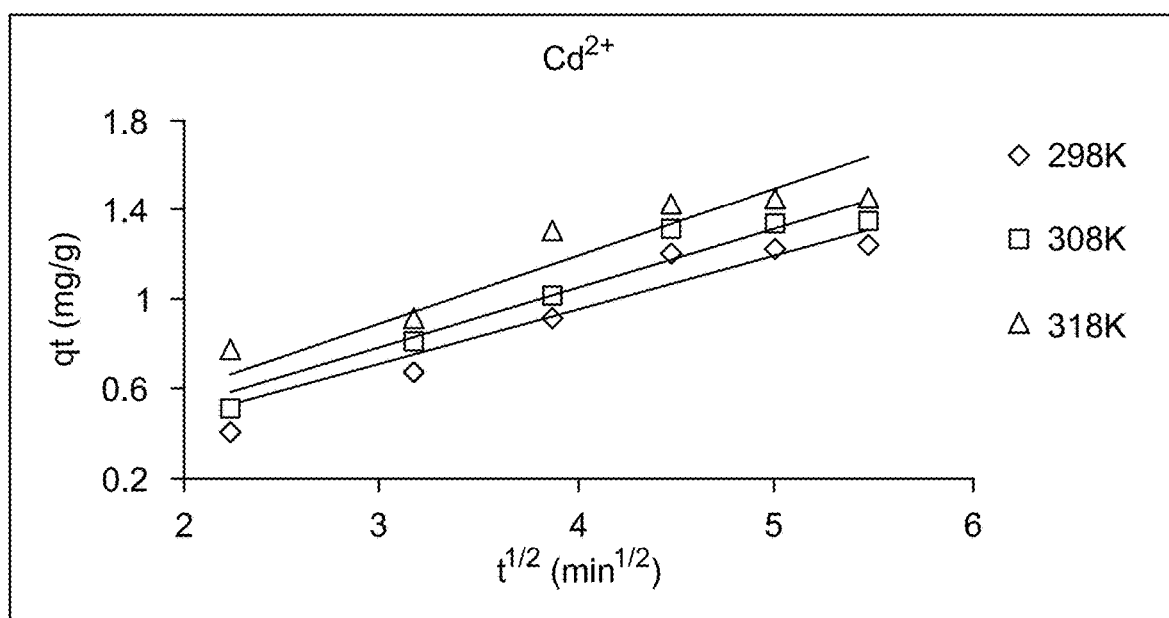
FIG. 13C is an overlay of intra-particle diffusion model plots illustrating the $Cd^{2+}$ adsorption kinetics of a sorbent device having alkaline-treated zeolite (AT-SDUSY) at 298K, 308K, and 318K, respectively.

The Morris-Weber equation plots did not pass through the origin, except for $Cd^{2+}$ (see FIGS. 13A-C), yet all with low $R^2$ values (Table 2). Thus, the mechanism involved could not be a diffusion based and so there exists a complicated mechanism [G. da C. Cunha, L. P. C. Romão, M. C. Santos, B. R. Araújo, S. Navickiene, V. L. de Pádua, Adsorption of trihalomethanes by humin: Batch and fixed bed column studies, Bioresour. Technol. 101 (2010) 3345-3354, incorporated herein by reference in its entirety].

$$q_t = K_{id} t^{1/2} + c \quad (6)$$

where $K_{id}$ is the rate constant of the intraparticle transport (mg/g·min$^{1/2}$), $q_t$ is the amount adsorbed at time t (mg/g).

Example 20

Adsorption Isotherm Studies

The Freundlich adsorption isotherm gives information about the surface heterogeneity as well as the exponential distribution of active sites and their energies. Langmuir, Freundlich, and Temkin models were employed to fit the isotherm data in this study.

Example 21

Langmuir Model

Figure 14A:
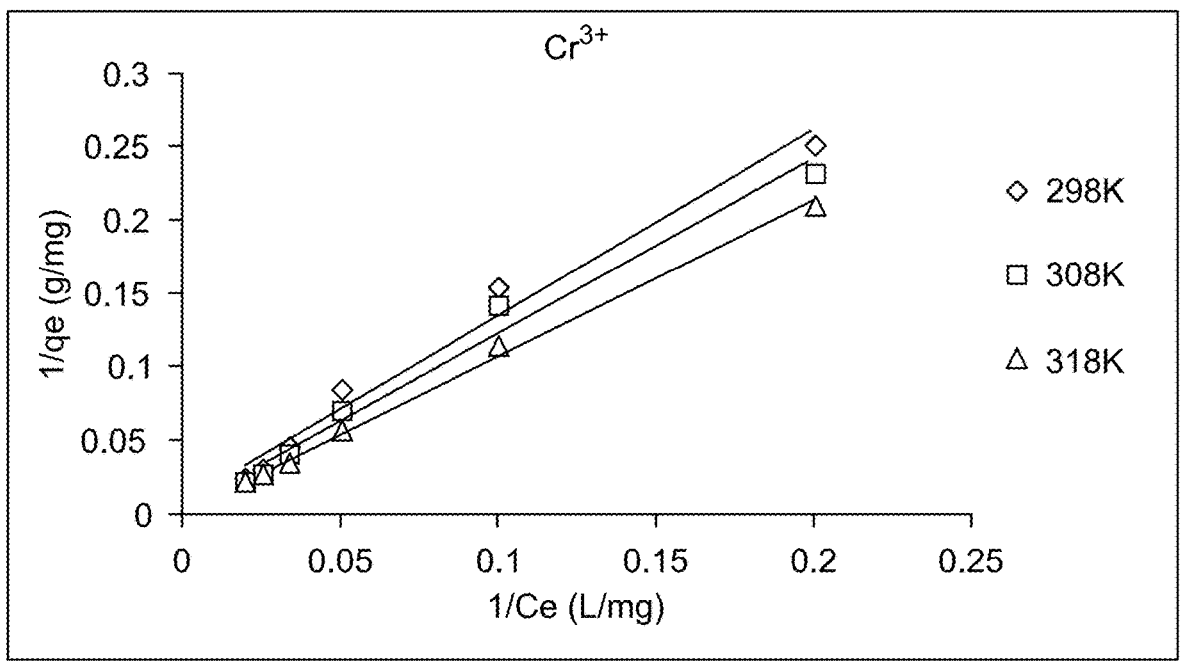
FIG. 14A is an overlay of Langmuir adsorption isotherms of the $Cr^{3+}$ adsorption by a sorbent device having alkaline-treated zeolite (AT-SDUSY) at 298K, 308K, and 318K, respectively.
Figure 14B:
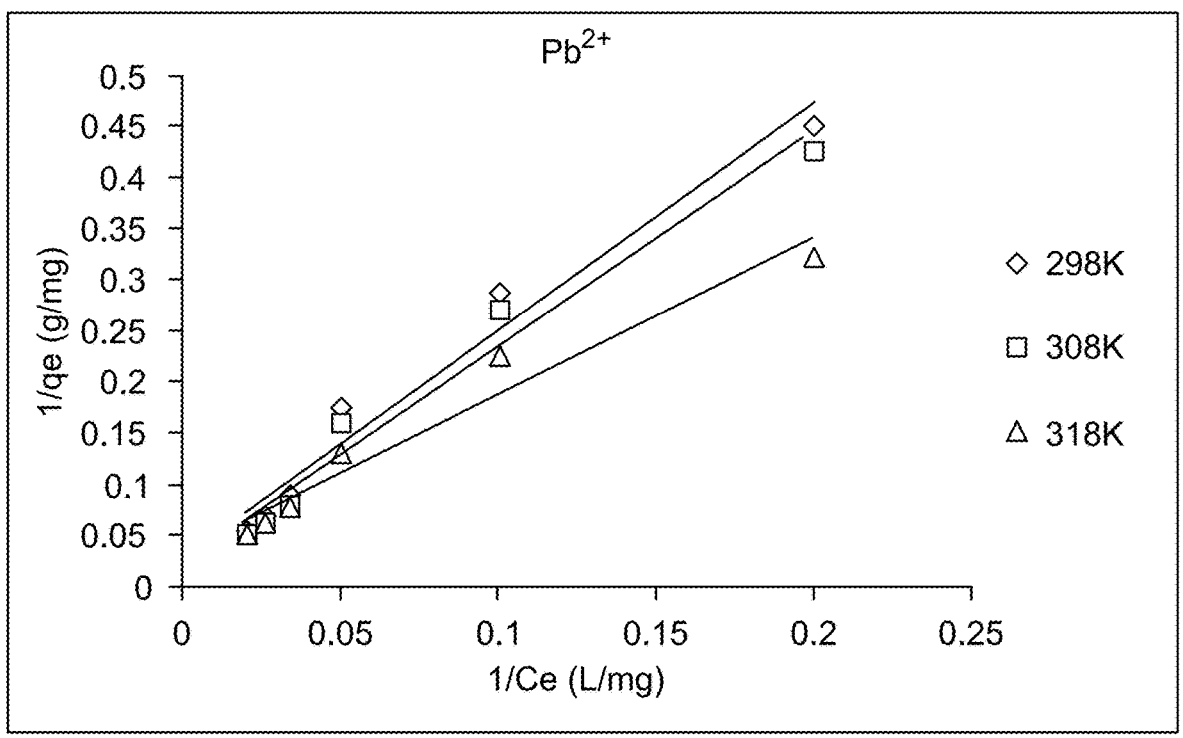
FIG. 14B is an overlay of Langmuir adsorption isotherms of the $Pb^{2+}$ adsorption by a sorbent device having alkaline-treated zeolite (AT-SDUSY) at 298K, 308K, and 318K, respectively.
Figure 14C:
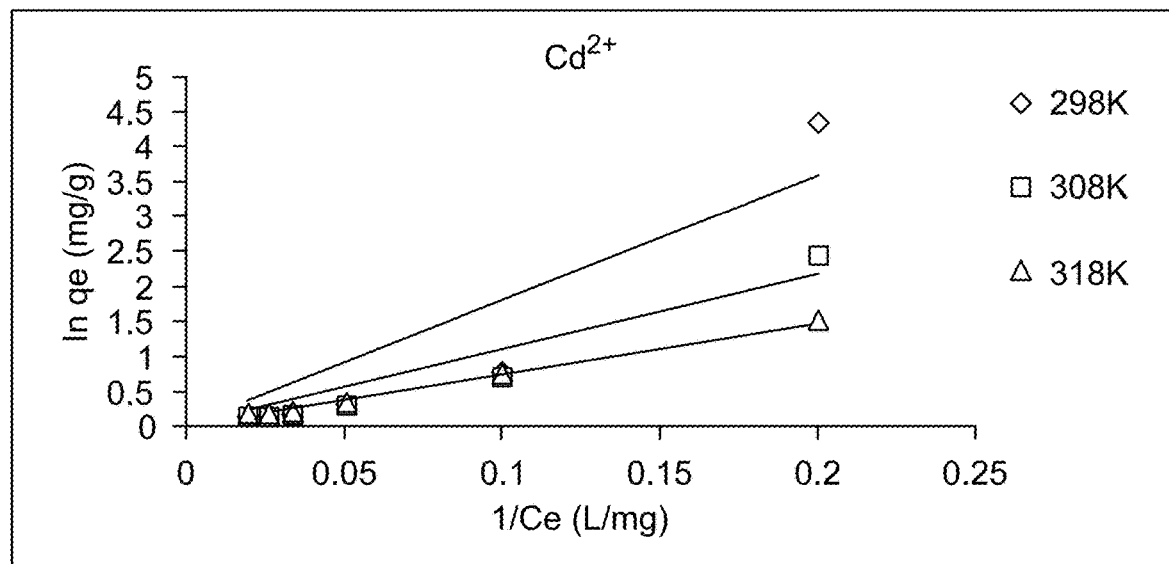
FIG. 14C is an overlay of Langmuir adsorption isotherms of the $Cd^{2+}$ adsorption by a sorbent device having alkaline-treated zeolite (AT-SDUSY) at 298K, 308K, and 318K, respectively.

The linearized form of Langmuir model equation (Eq. (7)) was used to make plots in FIGS. 14A-C.

$$\frac{1}{q_e} = \frac{1}{C_e} \cdot \frac{1}{b \, Q_o} + \frac{1}{Q_o} \quad (7)$$

where $q_e$ is the equilibrium ion uptake (mg·g$^{-1}$), Ce represents the equilibrium concentration (mg·L$^{-1}$), b is the sorption equilibrium constant (L·mg$^{-1}$), and $Q_o$ is the maximum adsorption capacity (mg·g$^{-1}$).

$$R_L = \frac{1}{1 + bC_o} \quad (8)$$

The isotherms obtained at different temperatures were regular positive and reflected the potential of the AT-SDUSY for heavy metal ions removal from water over a wide range of concentrations. The amount of metal ions adsorbed increased with temperature, indicating the endothermic nature of the adsorption process (see FIGS. 15A-C). The value 0<$R_L$<1 was obtained for the studied metal ions (Table 3), indicating the favorable type of the isotherms [B. H. Hameed, J. M. Salman, A. L. Ahmad, Adsorption isotherm and kinetic modeling of 2,4-D pesticide on activated carbon derived from date stones, J. Hazard. Mater. 163 (2009) 121-126; and A. Bhatnagar, A. K. Minocha, M. Sillanpää, Adsorptive removal of cobalt from aqueous solution by utilizing lemon peel as biosorbent, Biochem. Eng. J. 48 (2010) 181-186, each incorporated herein by reference in their entirety].

Example 22

Freundlich Model

This model is typically used for non-ideal sorption on heterogeneous surfaces and for multilayer sorption [J. Acharya, J. N. Sahu, C. R. Mohanty, B. C. Meikap, Removal of lead (II) from wastewater by activated carbon developed from Tamarind wood by zinc chloride activation, Chem. Eng. J. 149 (2009) 249-262, incorporated herein by reference in its entirety]. The logarithmic form of the Freundlich isotherm is expressed as:

$$\log q_e = \log K_F + \left(\frac{1}{n}\right) \log C_e \quad (9)$$

where n and $K_F$ are Freundlich isotherm constants related to adsorption intensity and adsorption capacity respectively.

Figure 10A:
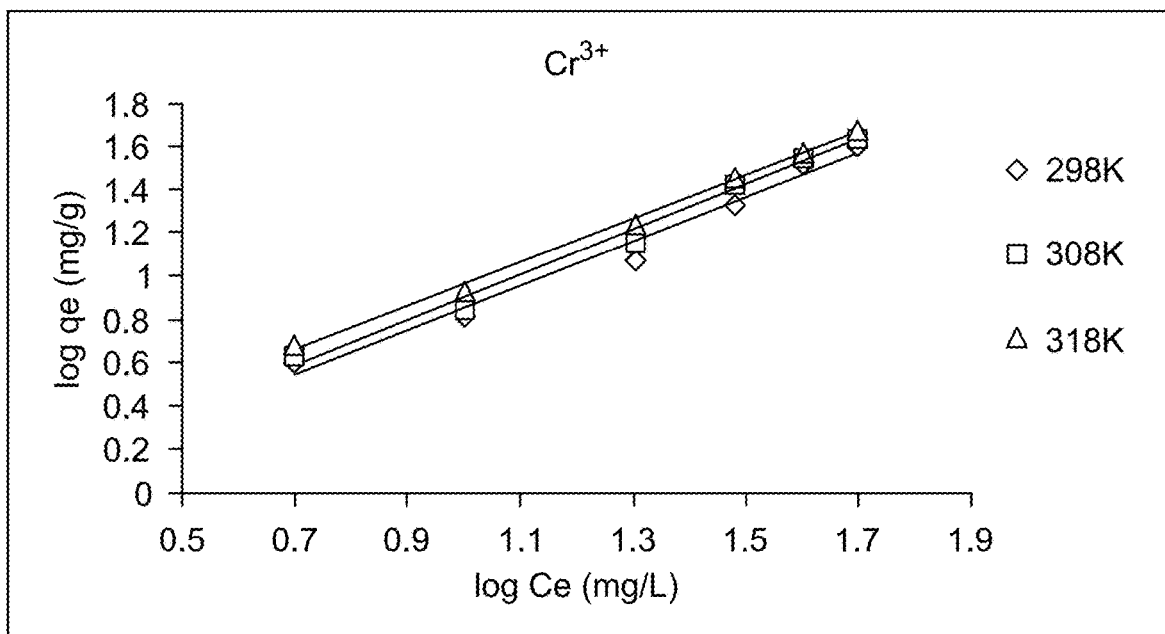
FIG. 10A is an overlay of Freundlich adsorption isotherms of the Cr$^{3+}$ adsorption by a sorbent device having alkaline-treated zeolite (AT-SDUSY) at 298K, 308K, and 318K, respectively.
Figure 10B:
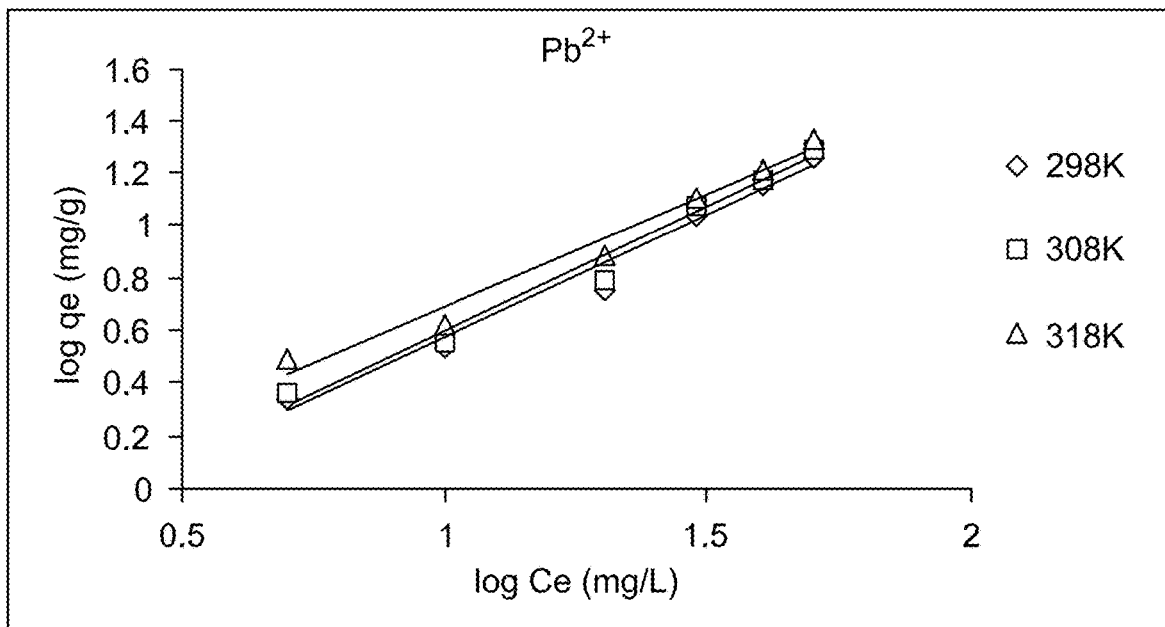
FIG. 10B is an overlay of Freundlich adsorption isotherms of the $Pb^{2+}$ adsorption by a sorbent device having alkaline-treated zeolite (AT-SDUSY) at 298K, 308K, and 318K, respectively.
Figure 10C:
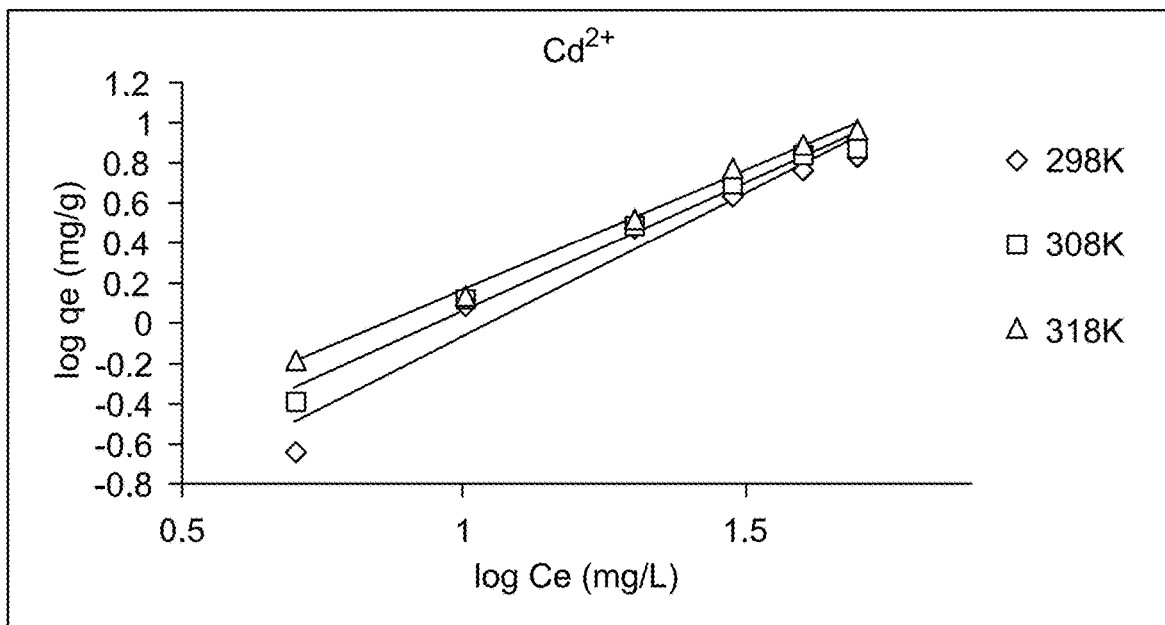
FIG. 10C is an overlay of Freundlich adsorption isotherms of the $Cd^{2+}$ adsorption by a sorbent device having alkaline-treated zeolite (AT-SDUSY) at 298K, 308K, and 318K, respectively.

FIGS. 10A-C show that the sorption of the studied metal ions fit well into the isotherm model, with good linearity. As summarized in Table 3, both sorption intensity (n) and sorption capacity ($K_F$) increased with temperature, with $K_F$ following the trend $Cr^{3+}$>$Pb^{2+}$>$Cd^{2+}$ at all temperatures while the sorption intensity was higher for $Pb^{2+}$. The enhanced sorption at higher temperatures could be due to the increase in active sites available for sorption and/or change in pore size, which enhanced the rate of intra-particle motion of the metal ions [D. Mohan, K. P. Singh, Single- and multi-component adsorption of cadmium and zinc using activated carbon derived from bagasse—an agricultural waste, Water Res. 36 (2002) 2304-2318, incorporated herein by reference in its entirety].

Example 23

Temkin Isotherm Model

From the Temkin adsorption isotherm expression in Eq. (10), the amount of energy required for the absorption by one layer on the adsorbent's surface can be obtained.

$$\ln q_e = \left(\frac{RT}{b_T}\right) \ln K_T + \left(\frac{RT}{b_T}\right) \ln C_e \quad (10)$$

where $b_T$ is the Temkin constant related to the sorption heat in kJ/mol, $K_T$ is the binding energy constant at equilibrium; an equivalence of maximum binding energy (L/g), R is the universal gas constant (0.008314 J/mol-K), and T is the absolute temperature in Kelvin (K).

Figure 15A:
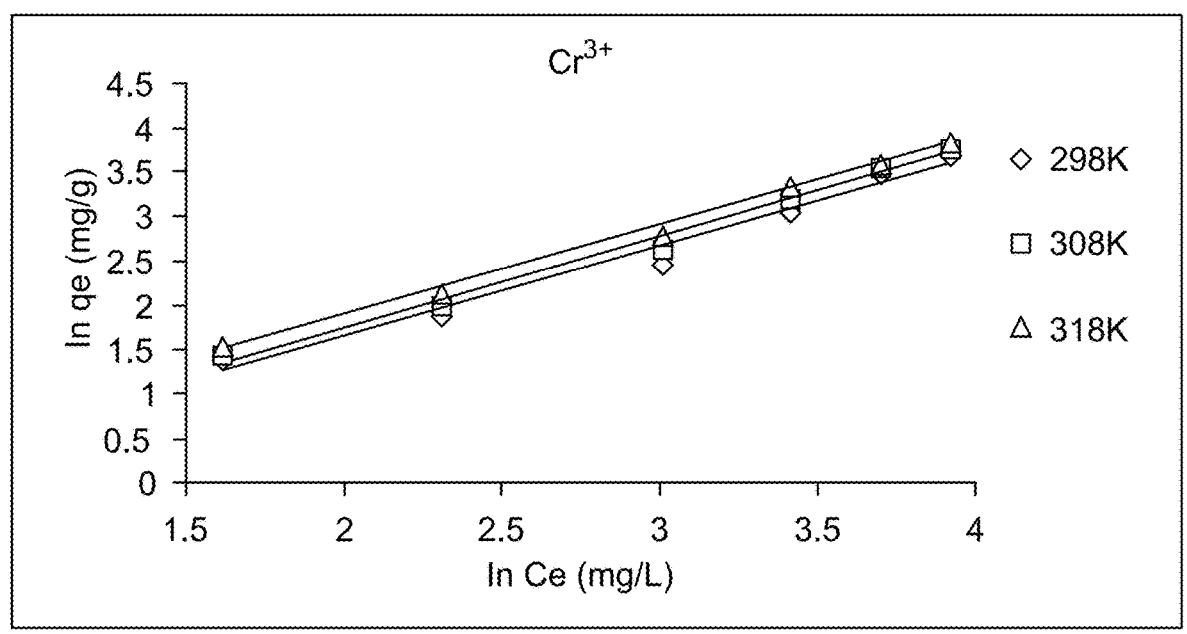
FIG. 15A is an overlay of Temkin adsorption isotherms of the $Cr^{3+}$ adsorption by a sorbent device having alkaline-treated zeolite (AT-SDUSY) at 298K, 308K, and 318K, respectively.
Figure 15B:
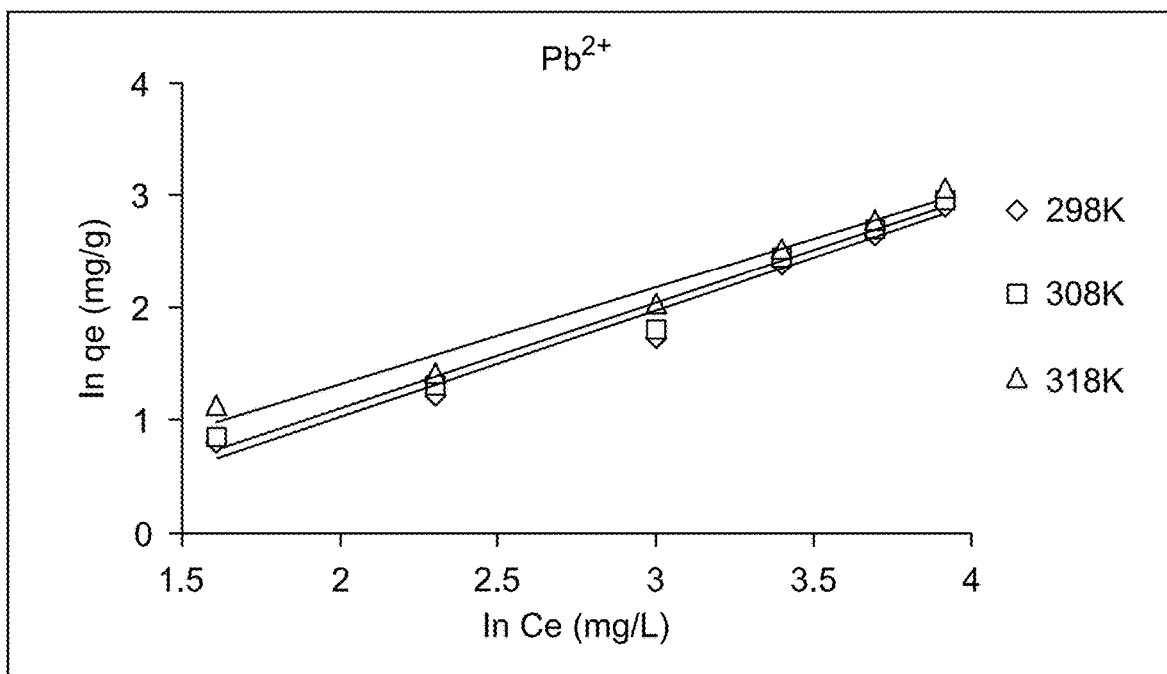
FIG. 15B is an overlay of Temkin adsorption isotherms of the $Pb^{2+}$ adsorption by a sorbent device having alkaline-treated zeolite (AT-SDUSY) at 298K, 308K, and 318K, respectively.
Figure 15C:
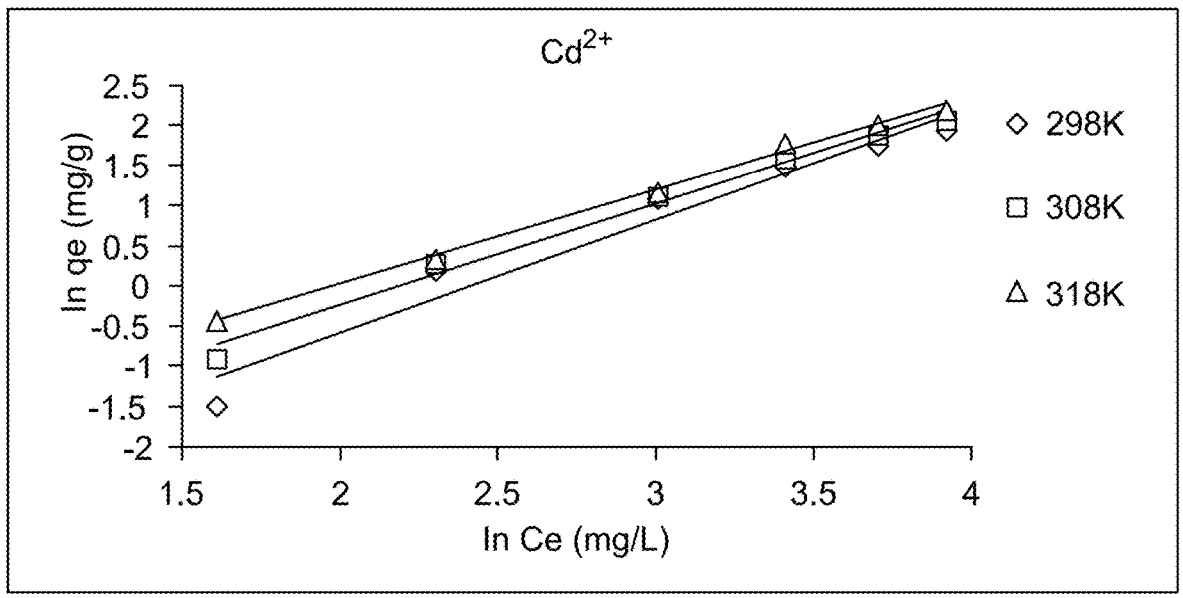
FIG. 15C is an overlay of Temkin adsorption isotherms of the $Cd^{2+}$ adsorption by a sorbent device having alkaline-treated zeolite (AT-SDUSY) at 298K, 308K, and 318K, respectively.

FIGS. 15A-C show the linearity of the plots, and as shown in the Table 3, the maximum binding at a particular temperature was inexplicably high for $Pb^{2+}$.

Example 24

As demonstrated by the present disclosure, faujasite (FAU) ultrastable Y-type zeolite sorbent was modified via alkaline treatment to achieve increased surface area and enhanced number of the functional groups that contribute to an effective sorption process of heavy metal ions from water. The sorbent was packed inside a porous polypropylene membrane bag and used for removal of heavy metal ions from water. This is the first application where sorbent packed membrane was employed for removal of heavy metals. The mesoporous zeolite-packed porous membrane bag device coupled with ICP-OES provided an effective alternative for routine analysis of heavy metal ions like lead(II), cadmium(II), and chromium(III) ions in aqueous system. The presently disclosed micro-scale device made with AT-SDUSY zeolite sorbent can be scaled up for extended water treatment applications to remove heavy metal ions.

The invention claimed is:

1. A method of isolating a heavy metal ion from an aqueous solution, the method comprising:
    contacting the aqueous solution with a sorbent device to form an aqueous mixture comprising a heavy metal loaded sorbent device;
    removing the heavy metal loaded sorbent device from the aqueous mixture thereby obtaining a purified solution having a reduced concentration of the heavy metal ion compared to an initial concentration;
    treating the heavy metal loaded sorbent device with an acid to desorb the heavy metal;
    wherein the sorbent device comprises:
        an alkaline-treated zeolite; and
        a porous membrane bag encapsulating the alkaline-treated zeolite,
        wherein the alkaline-treated zeolite comprises an ultrastable Y (USY) zeolite comprising a molar ratio of Si to Al in a range of 15:1 to 25:1, a Brunauer-Emmet-Taylor (BET) surface area in a range of 680 to 750 m$^2$/g, and an adsorption capacity in a range of 2 to 100 mg Cr(III) per gram, 1 to 75 mg Pb(II) per gram, and 0.4 to 50 mg Cd(II) per gram.

2. The method of claim 1, wherein the alkaline-treated zeolite is in a form of particles having an average particle diameter in a range of 300-600 nm.

3. The method of claim 1, wherein the alkaline-treated zeolite has an average pore diameter in a range of 13-40 nm, and a total pore volume in a range of 0.8-1.2 cm$^3$/g.

4. The method of claim 1, wherein the porous membrane bag has an average pore size in a range of 0.05-0.5 μm.

5. The method of claim 1, wherein the porous membrane bag comprises at least one polymer selected from the group consisting of polypropylene, polyethylene, nylon, polyvinylidene fluoride, and polyethersulfone.

6. The method of claim 1, wherein the porous membrane bag comprises a porous membrane having an average thickness in a range of 10-500 μm.

7. The method of claim 1, wherein 0.5-500 mg of the alkaline-treated zeolite is present per cm$^2$ exterior surface area of the porous membrane bag.

8. The method of claim 1, wherein the heavy metal is an ion of at least one heavy metal selected from the group consisting of Cr, Pb, and Cd.

9. The method of claim 1, wherein the aqueous solution has a pH in a range of 2 to 8.

10. The method of claim 1, wherein the initial concentration of the heavy metal ion in the aqueous solution ranges from 0.1 mg L$^{-1}$ to 50 mg L$^{-1}$.

11. The method of claim 1, wherein the alkaline-treated zeolite is present at a concentration in a range of 0.1-10 g per liter of the aqueous solution during the contacting.

12. The method of claim 1, wherein the sorbent device is contacted with the aqueous solution for 1-120 minutes.

13. The method of claim 1, wherein the sorbent device is contacted with the aqueous solution at a temperature in a range of 15° C. to 80° C.

14. The method of claim 1, wherein greater than 50% of a total mass of the heavy metal ion is removed from the aqueous solution.

\* \* \* \* \*